(12) United States Patent
Linnenbrügger et al.

(10) Patent No.: US 7,179,184 B2
(45) Date of Patent: Feb. 20, 2007

(54) LINK CHAIN AND METHOD OF MAKING, ASSEMBLING AND UTILIZING THE SAME

(75) Inventors: André Linnenbrügger, Bühl (DE); André Teubert, Bühl (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/628,045

(22) Filed: Jul. 25, 2003

(65) Prior Publication Data
US 2005/0261095 A1    Nov. 24, 2005

Related U.S. Application Data

(62) Division of application No. 09/844,087, filed on Apr. 27, 2001, now Pat. No. 6,695,731.

(30) Foreign Application Priority Data
Apr. 28, 2000   (DE)   ............................. 100 20 908

(51) Int. Cl.
F16G 5/18   (2006.01)
F16G 13/20   (2006.01)

(52) U.S. Cl. ..................... 474/215; 229/207

(58) Field of Classification Search ........ 474/212–215, 474/201–202, 206, 217, 218, 223, 228–233, 474/242–245, 207
See application file for complete search history.

(56) References Cited

U.S. PATENT DOCUMENTS

| | | | |
|---|---|---|---|
| 1,727,129 A | 9/1929 | Morse | |
| 1,743,500 A * | 1/1930 | Sturtevant | .................... 474/215 |
| 3,043,154 A * | 7/1962 | Erhardt et al. | .............. 474/215 |
| 4,337,057 A | 6/1982 | Horowitz et al. | |
| 4,344,761 A * | 8/1982 | Steuer | ......................... 474/245 |
| 4,345,904 A | 8/1982 | Numazawa et al. | |
| 4,500,305 A | 2/1985 | Rattunde | |
| 4,555,014 A * | 11/1985 | Krempa | ....................... 474/211 |
| 4,666,421 A | 5/1987 | Honda | |

(Continued)

FOREIGN PATENT DOCUMENTS

DE   G 94 07 472.0   10/1994

(Continued)

*Primary Examiner*—Marcus Charles
(74) *Attorney, Agent, or Firm*—Darby & Darby

(57) ABSTRACT

A link chain for use in the continuously variable transmission of the power train in a motor vehicle is assembled of pairs of composite identical or dissimilar links each having a stack of apertured plates, and of coupling units employing pairs of non-circular pins extending through registering portions of apertures in the respective stacks of plates. The pins are designed to cooperate with the plates to limit the extend of inward and outward pivotability of links of the respective pairs from positions of alignment, and the pins carry stops which act alone or cooperate with diaphragm springs or with other types of springs to prevent wobbling of the plates. The plates can be provided with projections which cooperate with the pins to limit the extent of pivotability of the pairs of links relative to each other and/or to prevent jamming of pairs of links in angular positions from which they cannot return to the positions of alignment. Each plate is traversed by two pairs of pins.

7 Claims, 5 Drawing Sheets

U.S. PATENT DOCUMENTS

| | | |
|---|---|---|
| 4,710,154 A | 12/1987 | Rattunde |
| 4,718,880 A * | 1/1988 | Zimmer .................. 474/201 |
| 4,871,344 A | 10/1989 | Morisawa |
| 4,927,404 A | 5/1990 | Rattunde |
| 5,046,991 A | 9/1991 | Friedmann |
| 5,073,154 A * | 12/1991 | Ivey et al. .................. 474/213 |
| 5,114,384 A | 5/1992 | Tsuyama |
| 5,192,252 A * | 3/1993 | Skurka et al. .............. 474/210 |
| 5,217,412 A | 6/1993 | Indlekofer et al. |
| 5,242,334 A | 9/1993 | Sugimoto et al. |
| 5,295,915 A | 3/1994 | Friedmann |
| 5,427,583 A | 6/1995 | Wolf |
| 5,501,309 A | 3/1996 | Walth et al. |
| 5,645,503 A | 7/1997 | Okuda et al. |
| 5,674,155 A | 10/1997 | Otto et al. |
| 5,711,730 A | 1/1998 | Friedman et al. |
| 5,725,447 A | 3/1998 | Friedmann et al. |
| 5,728,021 A | 3/1998 | van Rooij et al. |
| 5,738,198 A | 4/1998 | Walth et al. |
| 5,782,327 A | 7/1998 | Otto et al. |
| 5,860,863 A | 1/1999 | Friedmann et al. |
| 6,135,908 A | 10/2000 | Greiter |
| 6,142,903 A | 11/2000 | Heinrich |
| 6,346,058 B1 * | 2/2002 | Linnenbrugger et al. ... 474/215 |
| 6,558,281 B1 * | 5/2003 | Greiter ..................... 474/219 |

FOREIGN PATENT DOCUMENTS

| | | |
|---|---|---|
| DE | 197 43 676 A1 | 4/1998 |
| DE | 199 51 949 A1 | 5/2000 |
| DE | 199 60 914 A1 | 6/2000 |
| JP | 55-135251 A1 | 10/1980 |

* cited by examiner

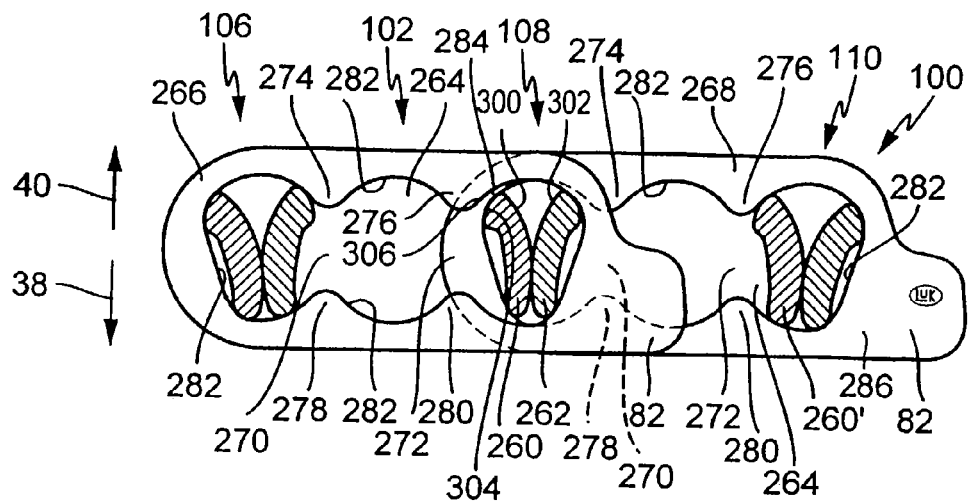
Fig. 9
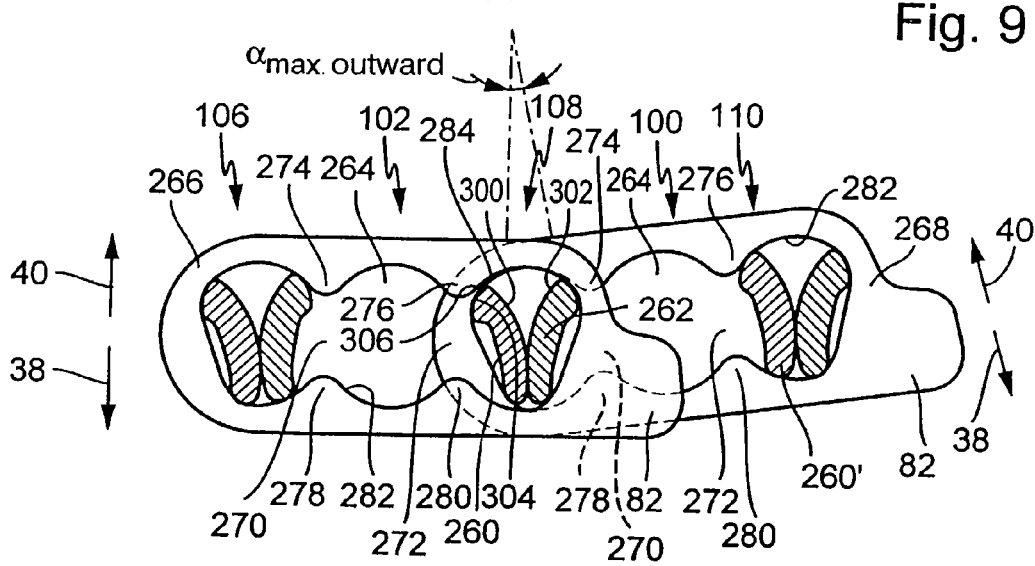
Fig. 10
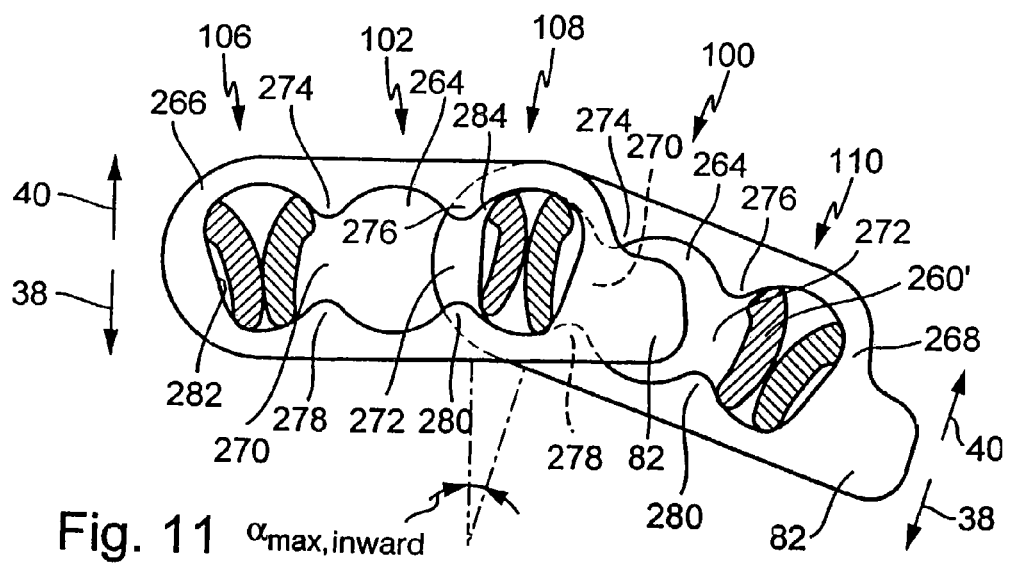
Fig. 11 $\alpha_{max, inward}$

LINK CHAIN AND METHOD OF MAKING, ASSEMBLING AND UTILIZING THE SAME

CROSS-REFERENCE TO RELATED CASES

This application is a division of application Ser. No. 09/844,087, filed Apr. 27, 2001, now U.S. Pat. No. 6,695,731, which is hereby incorporated by reference in its entirety.

The disclosure of the commonly owned pending German priority application Ser. No. 100 20 908.4, filed Apr. 18, 2000, as well as of each U.S. and foreign patent and patent application identified in the specification of the present application, is incorporated herein by reference.

BACKGROUND OF THE INVENTION

This invention relates to chains in general, and more particularly to improvements in link chains of the type adapted to be utilized with advantage for transmission of torque between rotary parts of transmissions or the like. For example, link chains of the type to which the present invention pertains can be employed to transmit torque between driving and driven pulleys or sheaves in continuously variable transmissions (CVT) of the type employed in the power trains (i.e., between the engines or other prime movers and the wheel axles) of motor vehicles.

Link chains of the type to which the present invention pertains comprise composite chain links having packages or stacks of overlapping plate-like components. The components of neighboring links partially overlap and alternate with each other and are articulately connected to one another by coupling units which permit neighboring links to pivot relative to each other. The coupling units comprise pin-shaped elements extending through windows provided in the components of the respective pairs of links. The end faces of the pin-shaped elements engage the conical surfaces of flanges forming part of aforementioned (normally adjustable) pulleys or sheaves over which the link chain is trained, e.g., in the aforementioned continuously variable transmission of the type often employed in the power trains of motor vehicles.

A drawback of many presently known link chains is that they are noisy due to excessive play between neighboring parts such as the plate-like components of the composite links, the pin-shaped elements of the units which couple neighboring links to each other, and/or the flanges of the pulleys at least one of which drives the chain and at least one of which receives torque from the chain when the transmission is in use.

Another drawback of many presently known link chains is that they undergo rapidly progressing pronounced wear in actual use of the chains; this results in the generation of even more pronounced noise which is particularly undesirable when the link chain is employed in the power train of a motor vehicle.

A further drawback of conventional link chains is that their links cannot or are not likely to reassume predetermined starting positions relative to each other as well as that they cannot be readily confined to repeated pivotal movements to predetermined end positions. This can affect the accuracy with which a conventional link chain can transmit torque in a continuously variable transmission or the like.

Still another drawback of presently known link chains is that they are complex, that their useful life is rather short as well as that they are too expensive, especialy if made to stand extensive periods of repeated use such as in the power trains of motor vehicles.

OBJECTS OF THE INVENTION

An object of the invention is to provide a link chain, particularly for use in CVT transmissions, which is simpler, safer and less expensive but more reliable (safer) than heretofore known link chains.

Another object of the invention is to provide a link chain the reliability and safety of which are less affected by manufacturing tolerances than those of conventional link chains.

A further object of the invention is to provide a link chain which can be assembled, installed in an infinitely variable transmission and/or otherwise manipulated in a manner much simpler than that known from conventional link chains.

An additional object of the present invention is to provide a link chain whose useful life is longer than that of presently known link chains and which is less prone to wear than conventional link chains.

Still another object of the invention is to provide novel and improved composite links as well as novel and improved articulate connections between the links of a link chain.

A further object of the instant invention is to provide novel plates or analogous constituents for use in composite links of a link chain which forms part of a continuously variable transmission.

Another object of the invention is to provide a novel and improved method of reducing the wear upon the links and/or other parts of the above outlined link chain.

An additional object of the instant invention is to provide a novel and improved method of providing a link chain which is quieter than heretofore known link chains.

Still another object of the invention is to provide a novel and improved combination of composite coupling units and composite links for use in the above outlined link chain.

A further object of the invention is to provide a novel and improved continuously variable transmission which employs one or more link chains of the above outlined character.

Another object of the invention is to provide a power train which can be utilized with advantage in a motor vehicle and embodies a CVT employing at least one link chain of the above outlined character.

An additional object of our present invention is to provide a link chain which is constructed and assembled in such a way that its links can be repeatedly pivoted to and from predetermined angular positions relative to each other.

Still another object of this invention is to provide the above outlined link chain with novel and improved noise-reducing means and with novel and improved means for distributing friction between neighboring plates of composite links of which the chain is assembled.

A further object of the invention is to provide the links of the improved chain with plates capable of confining the elements of coupling units between neighboring composite links in a novel and improved way, particularly in a manner to confine the elements to predetermined movements which cause a small amount of wear and which invariably take place between preselected portions of the surfaces of such elements and the internal surfaces of neighboring composite links.

Another object of the invention is to provide a novel and improved method of assembling the plates of composite links and the elements of coupling units for pairs of neighboring links in a manner such that the extent of friction between neighboring plates and/or the extent of play between neighboring plates can be determined and maintained with a heretofore unknown degree of accuracy and predictability.

An additional object of the invention is to provide a novel and improved method of confining the pin-shaped elements of coupling units for the links of link chains in the windows of plates of which the links consist.

Still another object of the invention is to provide a lighweight link chain which can be utilized as a superior substitute for existing link chains in existing types of continuously variable transmissions and/or other devices or apparatus or machines which employ or can employ link chains.

SUMMARY OF THE INVENTION

One feature of the present invention resides in the provision of a link chain which comprises a plurality of pairs of neighboring composite links. The links of each pair are movable to and from predetermined positions of at least substantial linear alignment with each other and each such link can include a stack or pile of registering plates. The link chain further comprises a plurality of coupling units, one for each pair of links and each serving to articulately connect the links of the respective pair to each other. Each such coupling unit preferably includes one, two or at least two (preferably two) adjacent coupling elements (e.g., substantially pin-shaped non-circular coupling elements), and the link chain further comprises at least one antijam (i.e., blockage preventing or obstruction preventing or interference preventing) device for each pair of links; each such device can include means for preventing movements of the respective pair of links to second (i.e., other than predetermined) positions from which the links are incapable of moving (or not readily movable) to their respective predetermined positions. Such link chains are much less likely to obstruct proper or optimum operation of a transmission than link chains which are not equipped with antijam devices.

Another feature of the invention resides in the provision of a link chain which comprises a plurality of pairs of neighboring composite links each of which includes a stack of plates. At least one of the links has a pitch of at least 9 mm (as used herein, the pitch is indicative of the spacing of the links from center to center; reference may be had, for example, to column 4 in the specification of U.S. Pat. No. 5,427,583 granted Jun. 27, 1995 to Wolf for "LOW-NOISE, TRIPLE SIDE BAR SPROCKET CHAIN FOR INFINITELY VARIABLE TRANSMISSION"), and the link chain further comprises a plurality of coupling units, one for each pair of links and each articulately connecting the respective pair of neighboring links for pivotal movement relative to each other in clockwise and counterclockwise directions. Each coupling unit includes at least two coupling elements which are adjacent each other, and the improved link chain further comprises at least one means for limiting the pivotability of the at least one link and a neighboring link in at least one of the clockwise and counterclockwise directions to an acute angle, e.g., to an angle of less than 30° and often or preferably less than 27°.

A further feature of the instant invention resides in the provision of a link chain which comprises a plurality of pairs of neighboring composite links. The links of each pair are movable to and from predetermined positions relative to each other and each link preferably comprises a stack of plates, e.g., two or more plates which are or which can be identical with each other and which accurately overlap or overlie each other. The improved link chain further comprises a plurality of coupling units, one for each pair of links and each articulately connecting the respective pair of links to each other for clockwise and counterclockwise pivotal movement to and from the respective predetermined positions. Each coupling unit includes at least two adjacent coupling elements which are angularly movable relative to each other and relative to the respective pair of links to and from preselected positions, and the link chain further comprises at least one position restoring device which includes means for confining the coupling elements of at least one of the coupling units to the preselected positions upon-completion of movement of the corresponding pair of links to and from the respective predetermined positions.

An additional feature of our invention resides in the provision of a link chain having an inner side (i.e., that side which is surrounded by the chain links) and an outer side and comprising a plurality of pairs of neighboring composite links. The links of each pair are pivotable relative to each other and each link includes a stack of elongated plates each having a first end and a second end, as seen in the (forward and rearward) directions of movement of the chain. The chain further comprises a plurality of coupling units, one for each pair of neighboring links and each articulately connecting the respective pair of links to each other. Each coupling unit includes at least two adjacent parallel pin-shaped non-circular coupling elements and at least one of the elongated plates has an outline provided with projections disposed at one of its ends at one side (i.e., the inner side or the outer side) of the chain. Each such projection can serve a single purpose (e.g., to limit the extent of pivotal movement of two links of a pair of links in the clockwise or counterclockwise direction) or two or more different purposes.

Still another feature of the invention resides in the provision of a link chain having an inner side and an outer side and comprising a plurality of pairs of neighboring composite links. The links of each pair are pivotable relative to each other and each link includes a stack of elongated plates. The improved chain further comprises a plurality of coupling units, one for each pair of links and each pivotably connecting the respective pair of links to each other. Each coupling unit includes at least two adjacent coupling elements and at least some of the plates have elongated windows extending lengthwise between the first and second end portions of the respective elongated plates. The end portions of each plate are different from each other, at least at the inner side of the chain and at least in regions adjacent the ends of the respective windows. The coupling elements extend through the windows of the respective plates.

A further feature of the invention resides in the provision of a link chain which comprises a plurality of pairs of neighboring composite links. The links of each pair are pivotable relative to each other and each link includes a stack of preferably accurately aligned plates. The chain further comprises a plurality of coupling units, one for each pair of links and each pivotably connecting the links of the respective pair with each other. Each coupling unit includes at least two adjacent coupling elements and at least some of the plates have windows for the respective coupling elements. At least some of the coupling elements are rockable about axes which are normal to the respective plates and such coupling elements have rounded external surfaces contacting rounded internal surfaces of the respective plates in their windows. The ratio of the radii of curvature of the internal surfaces to the radii of curvature of the external surfaces is preferably less than ten, preferably less than five. A presently preferred ratio is two or close to two.

A further feature of our invention resides in the provision of a link chain which comprises a plurality of pairs of neighboring composite links. The links of each pair are pivotable relative to each other and each link includes a stack of plates. The link chain further comprises a plurality of coupling units, one for each pair of links and each pivotably connecting the respective links to each other. Each coupling unit includes at least two adjacent coupling elements and at least some of the plates have windows for the respective coupling elements. At least one of the coupling elements is rockable relative to the respective plates and has an external surface which—under predetermined circumstances of use of the chain—contacts first portions of internal surfaces of the respective plates in the corresponding windows. The internal surfaces further include second portions and, when the chain is in actual use, the stresses being applied to the second portions of the internal surfaces exceed the stresses being applied to the first portions of such surfaces.

Another feature of the present invention resides in the provision of a link chain which comprises a plurality of pairs of neighboring composite links. The links of each pair are pivotable relative to each other and each link includes a stack of plates. The link chain further comprises a plurality of coupling units, one for each pair of links and each pivotably connecting the respective pair of links to each other. Each coupling unit includes at least two adjacent coupling elements and at least some of the plates have windows for the respective coupling elements. Each window has two sections each of which is traversed by the coupling elements of a coupling unit and each window further includes a constriction for each of its sections. The constrictions are adjacent the respective sections of the windows. At least one coupling element in at least one of the window sections contacts the plates adjacent the respective restriction.

An additional feature of the invention resides in the provision of a link chain which comprises a plurality of pairs of neighboring composite links each of which includes or consists of a stack of plates. The chain further comprises a plurality of coupling units, one for each pair of links and each articulately connecting the respective pair of links to each other. Each coupling unit includes a plurality of adjacent elongated coupling elements and the link chain further comprises means for limiting the extent of movability of at least some of the plates lengthwise of the respective coupling elements, namely for preventing any movements of the plates lengthwise of the respective coupling elements or for ensuring that movements of the plates lengthwise of the respective coupling elements are maintained within a preselected range.

For example, the aforementioned limiting means can include resilient means constructed, arranged and installed to yieldably oppose movements of the plates of at least one of the links lengthwise of at least one coupling element of the respective coupling unit.

In accordance with one presently preferred specific embodiment, the improved link chain comprises a plurality of pairs of neighboring composite links each of which includes a stack of overlapping plates, and a plurality of coupling units, one for each pair of links and each articulately connecting the respective pair of links to each other.

Each coupling unit includes a plurality of adjacent elongated coupling elements extending through registering windows provided in the stacks of plates of the respective pairs of links, and the link chain further comprises means for limiting the extent of play (if any) between the plates of stacks which form part of at least one pair of neighboring links to not more than 0.2 mm.

A further feature of the invention resides in the provision of a link chain which comprises a plurality of pairs of neighboring composite links each of which includes a stack of plates, and a plurality of coupling units, one for each pair of links and each articulately connecting the links of the respective pair to each other. Each coupling unit includes at least two adjacent elongated coupling elements extending through windows which are provided in the stacks of plates of the respective pairs of links, and the link chain further comprises means for limiting the extent of movability of the stacks of plates of at least one pair of links lengthwise of the respective coupling elements. The limiting means comprises stops provided on at least one coupling element traversing the plates of the at least one pair of links, and the stops are spaced apart from each other a predetermined distance which at least matches the actual combined thickness of the stacks of plates which are traversed by the at least one coupling element. In other words, the method of assembling such chain includes the step of actually measuring the combined thickness of the stacks of plates to be traversed or being traversed by the at least one coupling element.

An additional feature of the invention resides in the provision of a link chain which comprises a plurality of pairs of neighboring composite links. The links of each pair are pivotable relative to each other and each link includes a stack of plates. The link chain further comprises a plurality of coupling units, one for each pair of links and each articulately connecting the respective pair of links to each other. Each coupling unit includes a plurality of coupling elements extending through windows which are provided in the plates, and the link chain further comprises means for limiting the extent of pivotability of the Links of at least one pair of links relative to each other. The limiting means includes a projection provided on at least one plate of at least one stack forming part of the at least one pair of links and abutting one coupling element of the coupling unit at the at least one pair of links in at least one predetermined angular position of the links of the at least one pair of links relative to each other.

The coupling unit at the at least one pair of links is not or need not be identical with the coupling unit for the at least one pair of links; such coupling units can be adjacent each other.

Another feature of our present invention resides in the provision of a transmission, such as a continuously variable transmission in the power train of a motor vehicle. The transmission comprises adjustable rotary driving and driven pulleys (preferably adjustable pulleys of the type disclosed, for example, in commonly owned U.S. Pat. No. 5,711,730 granted Jan. 27, 1998 to Friedmann et al. for "TORQUE MONITORING APPARATUS"), and a torque transmitting link chain which is trained over the pulleys and includes a plurality of pairs of neighboring composite links and a plurality of coupling units, one for each pair of links and each articulately connecting the links of the respective pair to each other. Each coupling unit includes at least two adjacent coupling elements and the link chain further comprises an antijam device for at least one pair of links. Such antijam device can comprise means for preventing movements of the links of the at least one pair to positions from which the links are incapable of reliably moving to positions of at least substantial linear alignment with each other.

The link chain can further comprise at least one means for limiting the pivotability of the links of the at least one pair from the positions of at least substantially linear alignment with each other through a predetermined maximum angle as well as means for maintaining the chain in an operative condition in each of a predetermined number of adjustments of the pulleys.

Another feature of the present invention resides in the provision of a link chain which comprises a plurality of pairs of composite links each of which has a first end and a second end. The links of at least one of the pairs of links respectively include first and second stacks of elongated plates; the plates of one of the stacks have first lengths and the plates of the other stack have second lengths different from the first lengths. The link chain further comprises coupling units each having a plurality of coupling elements; each such unit articulately connects one end of one link of a pair of links with one end of the other link of such pair.

Still another feature of the invention resides in the provision of a link chain which comprises a plurality of pairs of chain links each of which includes a stack of plates. The plates of one link which forms part of at least one of the pairs of links have a first chain pitch and the plates of the other link forming part of such at least one pair of links have a different second chain pitch. The link chain further comprises means for articulately connecting the plates of each pair of plates with one another.

Another link chain which is constructed and assembled in accordance with the present invention can comprise pairs of chain links and means for pivotally coupling the links of each pair to each other. Each link comprises a stack of elongated plates having first and second ends and the plates of at least one link of at least one pair of links have projections at one of their ends. The links of the at least one pair are pivotable relative to each other from first positions of at least substantial alignment with each other to and from second positions which are offset through a predetermined angle relative to the first positions. The projections engage abutment means of the chain in the second positions of the links of the at least one pair of links.

The abutment means can form part of the coupling means.

The plates of at least one link of the at least one pair of links can have first lengths, and the plates forming part of the other link of the at least one pair of links can have second lengths different from the first lengths.

Furthermore, the plates of the at least one link of the at least one pair of links can have first chain pitches, and the plates forming part of the other link of the at least one pair of links can have second chain pitches different from the first chain pitches.

The abutment means can have a first profile and the projections can have a second profile which is complementary to the first profile.

In accordance with another feature of the present invention, the improved link chain can comprise a plurality of pairs of chain links each of which includes a stack of elongated plates, and means for pivotably coupling the links of the pairs of links to each other. The plates of at least one of the links can exhibit a plurality of first characteristics Including first lengths and first pitches $p1$, and the plates of at least one other link can exhibit a plurality of second characteristics including second lengths and second pitches $p2$. At least one of the first characteristics is different from at least one of the second characteristics, and the chain links of at least one pair of links are pivotable relative to ach other through a first maximum angle $\alpha_{max1}$, the chain links of at least one other pair of links are pivotable relative to each other through a different second maximum angle $\alpha_{max2}$, and the ratio of such angles and of the pitches satisfies the equation $$\alpha_{max2} \geq \frac{p2}{p1} * \alpha_{max1}.$$

The angle $\alpha_{max1}$ is or can be between 15° and 25°.

A further feature of the invention resides in the provision of a link chain having an inner side and an outer side and comprising a plurality of pairs of links each including a stack of plates. The chain further comprises means for pivotably coupling the links of the pairs of links to each other. The links of each pair are respectively pivotable relative to each other through first and second angles toward the outer side and toward the inner side of the chain, and the latter further comprises means for limiting the pairs of links to pivotal movements through the first and second angles. Such limiting means includes first abutments provided on at least some of the links and arranged to determine the first angles, and second abutments provided on at least some of the links and arranged to determine the second angles.

The limiting means can further include portions of the coupling means.

The last mentioned link chain can further comprise means for preventing jamming of the pairs of links upon pivoting through the first angles, and means for preventing jamming of the pairs of links upon pivoting through the second angles.

In accordance with a further feature of the invention, the improved link chain comprises a plurality of pairs of links each of which includes at least one plate. The links include first, second, third and fourth links and the link chain further comprises first, second and third coupling units which movably connect the first and second, the second and third and the third and fourth links to each other. Each coupling unit includes at least one coupling element and the plates have windows through which the respective coupling elements extend. The coupling elements are arranged to move during movement of links of the respective pairs of links relative to each other.

The links of the pairs of links are pivotable relative to each other and the coupling elements are arranged to turn during pivoting of the links of the respective pairs relative to each other.

At least one of the coupling elements can be received in at least one of the respective windows with a play of less than 0.1 mm.

The external surfaces of the coupling elements can contact the plates of the respective pairs of links in predetermined positions of the respective pairs of links relative to each other.

The external surface of at least one coupling element can be arranged to contact an internal surface of at least one plate forming part of one of the respective pair of links at the outer side of the chain.

Furthermore, the external surface of at least one coupling element can be arranged to contact the internal surface of at least one plate forming part of one of the respective links at the inner side of the chain.

The arrangement can be such that the links are movable lengthwise of the chain in at least one direction in actual use of the chain and the external surface of at least one coupling element can be arranged to contact the internal surface of at least one plate of the respective pair of links at the inner side of the chain and as seen in the at least one direction.

The windows of the plates can be provided with constrictions and the external surface of at least one of the coupling elements can be arranged to contact the internal surface of at least one plate of at least one of the respective pair of links in the region of the respective constriction.

The plates can be provided with at least partially rounded internal surfaces bounding the respective windows, and the coupling elements can be provided with at least partially rounded external surfaces arranged to contact the respective internal surfaces in predetermined positions of the respective pairs of links relative to each other. The radii of curvature of the rounded internal surfaces can greatly exceed the radii of curvature of the external surfaces; for example, the radius of curvature of each internal surface can be up to ten times the radius of curvature of an external surface. It is often preferred to select the radii of curvature in such a way that the radius of curvature of each internal surface in twice the radius of curvature of an external surface.

It is also within the purview of the invention to construct and assemble the improved link chain in such a way that it comprises a plurality of pairs of links each having a stack of at least substantially registering plates, and means for pivotably coupling the links of the pairs of links to each other. The coupling means comprise elongated coupling elements extending through windows provided in the stacks of plates of the respective pairs of links and the chain further comprises means for biasing the plates of the pairs of links lengthwise of the respective coupling elements. The biasing means has a spring gradient in the range of between about 0.2 N/mm and 200 N/mm, preferably between about 2 N/mm and 10 N/mm.

The biasing means is arranged to eliminate play between the plates of the stacks of plates being traversed by the coupling elements.

A link chain which embodies another feature of the invention can comprise a plurality of pairs of links each including a stack or pile of plates which are provided with at least partially registering windows, and a plurality of coupling units each of which is arranged to pivotably couple a pair of links to each other for movement toward an outer side and an inner side of the link chain. Each coupling unit includes at least one elongated coupling element having spaced-apart cam faces and extending through the windows of plates forming part of the respective pair of links. The stacks through which the coupling elements extend include first outer plates disposed at a predetermined distance from one cam face of the respective coupling element and second outer plates disposed at the same predetermined distance from the other cam face of the respective coupling element.

Another link chain which embodies our invention and is particularly suited for use in a continuously variable transmission comprises a plurality of pairs of links each of which includes a stack of plates having at least partially registering windows, and a plurality of coupling units, one for each pair of links and each including at least one pin extending through the windows of stacks of plates of the respective pair of links. Such chain further comprises pairs of stops provided on the pins and flanking the respective stacks of plates. The stops of each pair are spaced apart from each other by a distance exceeding by a predetermined value, including zero, the measured combined thickness of the stacks of plates which are traversed by the respective pin. Thus, one actually measures the combined thickness of the stacks of plates which are traversed by a pin, and one thereupon selects the distance between the stops of the respective pair in dependency upon the measured combined thickness.

Another improved link chain comprises a plurality of pairs of links each having at least one apertured plate, and a plurality of coupling units, one for each pair of links and each including a non-circular pin extending through the apertured plates of the respective pair of links. The chain further comprises means for counteracting wobbling of plates which are traversed by at least one of the pins and means for permitting limited pivoting of pairs of links relative to each other. The means for permitting limited pivoting can include portions of the plates and/or portions of the pins.

Thus, our improved link chain can be constructed and assembled in such a way that it embodies single features which distinguish it from conventional link chains, or two or more novel features (such as the aforementioned means for counteracting wobbling of the plates and the means for permitting limited pivoting of the links of each pair relative to each other).

A continuously variable transmission which can be utilized in the power train of a motor vehicle and which embodies our present invention can comprise adjustable driving and driven pulleys and a link chain which is trained over the pulleys and includes a plurality of pairs of neighboring composite links. The links of each pair are movable to and from predetermined positions of at least substantially linear alignment with each other and each link includes a stack of plates. The chain further comprises a plurality of coupling units, one for each pair of links and each articulately connecting the links of the respective pair to each other. Each coupling unit includes at least two adjacent coupling elements in the form of pins, shafts or the like and the chain further comprises at least one antijam device for each pair of links. Each antijam device comprises means for prevetig movements of links of the respective pair of links to second positions from which the links are incapable of moving to their respective predetermined positions.

A further feature of the invention resides in the provision of a method of assembling a link chain, particularly for use in a continuously variable transmission. The method comprises the steps of articulately connecting pairs of composite elongated links to each other for pivotal movement about axes extending transversely of the respective elongated links, and at least one of a plurality of additional steps such as limiting the extent of pivotability of the links of at least one of the pairs of links relative to each other and/or counteracting the tendency (if any) of links of at least one of the pairs of links to wobble with respect to each other. The connecting step can include articulately connecting pairs of identical, similar or dissimilar links to each other.

The novel features which are considered as characteristic of the invention are set forth in particular in the appended claims. The improved link chain itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a plan view of a first embodiment of a plate which can be utilized as one of a stack of superimposed plates in a composite link for use in a continuously variable transmission or the like;

FIG. 9 is a fragmentary partly elevational and partly sectional view of a link chain with two links shown in first (median) angular positions relative to each other;

FIG. 10 illustrates the structure of FIG. 9 but with the links pivoted to first end positions relative to each other; and FIG. 11 illustrates the structure of FIG. 9 but with the links pivoted to second end positions relative to each other.

DESCRIPTION OF PREFERRED EMBODIMENTS

Figure 1:
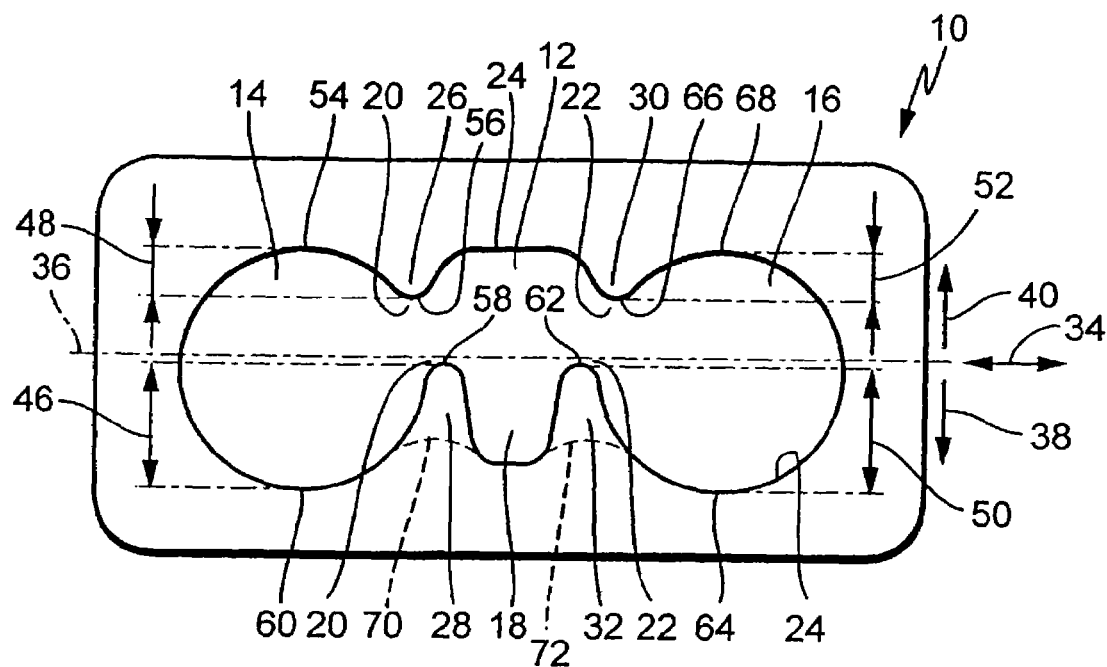

FIG. 1 shows an elongated link plate 10 having a rectangular outline and forming part of a link chain including a plurality of identical or different (preferably identical) link plates. More specifically, the link plate 10 (hereinafter called plate for short) forms part of a chain link which is a pile or stack of identical or similar plates and is articulately connected with two neighboring links in a manner to be described in detail with reference to FIG. 3, 4, 5, 6, 7 or 8, or with reference to FIGS. 9 to 11.

The plate 10 is provided with an elongated opening or window 12 (hereinafter window) having two sections 14, 16 which, in the embodiment of FIG. 1, are at least substantial mirror images of each other with reference to a symmetry plane normal to the central longitudinal axis 36 of the plate 10. A third or median section 18 of the window 12 is located between and respectively communicates with the sections 14, 16 by way of constrictions 20, 22 provided in the plate 10.

The configuration or outline of the constriction 20 is determined by two projections 26, 28 which confront each other in the radial direction of the link chain embodying the plate 10. The projection 26 is disposed between the window sections 14, 16 in a central portion 24 of the plate 10, and the projection 28 is also disposed in the central portion 24 but at the opposite side of the axis 36. The constriction 22 is defined by projections 30, 32 which are at least substantial mirror images of the projections 26, 28, respectively, with reference to the aforementioned symmetry plane.

The projections 28, 32 extend from the axis 36 in the direction of an arrow 38, namely toward the radially inner side of the link chain. The locus of the radially outer side of the plate 10 is indicated by an arrow 40.

The sections 14, 16 of the window 12 receive coupling units each of which includes a plurality of (such as two) coupling elements 112, 114 (see FIG. 3) serving to articulately (pivotably) couple pairs of neighboring chain links (such as the chain links 100, 102, 104 shown in FIG. 3) to each other. The constrictions 20, 22 are dimensioned in such a way that they prevent the pairs of coupling elements 112, 114 (hereinafter called pins for short) from leaving the respective sections 14, 16 of the window 12, i.e., from moving relative to the plate 10 in directions indicated by the heads of a double-headed arrow 34. This arrow indicates the (forward and rearward) directions of movement of a link chain which embodies links having plates 10 of the type shown in FIG. 1, e.g., in a CVT transmission wherein the link chain is trained over at least two adjustable pulleys or sheaves. Reference may be had, for example, to commonly owned U.S. Pat. No. 5,295,915 granted Mar. 22, 1994 to Friedmann for "CONTINUOUSLY VARIABLE SPEED TRANSMISSION".

FIG. 1 shows that the plate 10 is asymmetrical with reference to a plane which is normal to the plane of this Figure and includes the axis 36, i.e., with reference to a plane extending in the directions (arrow 34) of advancement of the link chain when in actual use. The lack of symmetry is particularly pronounced in the regions of those portions of edge face 24 bounding the window 12 which are located at opposite sides of the aforesaid symmetry plane including the axis 36. On the other hand, the illustrated plate 10 does or can consist of two halves which are, mirror images of each other with reference to a symmetry plane that is normal to the plane of FIG. 1, that is normal to the plane including the axis 36, and that halves the third or median section 18 of the window 12.

The lack of symmetry of the two plate halves at the opposite sides of the axis 36 is also apparent upon a comparison of the dimensions of the (longer) projections 28, 32 with the dimensions of the (shorter) projections 26, 30. Each of the projections 26, 28, 30, 32 resembles a more or less pronounced proboscis and is bounded by a more or less smooth and preferably rounded surface (i.e., a surface devoid of abrupt transitions) The lateral distance 46 between the symmetry plane including the axis 36 and the innermost portion 58 of the projection 28 at the side adjacent the window section 14 exceeds the lateral distance 48 between the plane of the tip 58 of the projection 26 and the outermost portion 54 of the window section 14 by at least 10%, preferably by at least 20% or at least 40% or at least 50%, or at least 70% or at least 90% or at least 100% or at least 120% or at least 150% or at least 200%.

The lateral distance 50 between the plane including the tip 62 of the projection 32 and the innermost portion 64 of the window section 16 exceeds the lateral distance 52 between the planes of the tip 66 of the projection 30 and the outermost portion 68 of the window section 16 by at least 10%, preferably by at least 20% or at least 40% or at least 50% or at least 70% or at least 90% or at least 100% or at least 125% or at least 130% or at least 200%.

The distance 48 is indicative of the height of the projection 26 as measured in a direction from the outer side of the plate 10 toward the plane of the axis 36, i.e., of the distance between the point 54 of the window section 14 and the innermost point or tip 56 of the projection 26. The distance 46 equals that between the innermost point 60 of the window section 14 and the outermost point 58 of the projection 28 as measured at right angles to the plane including the axis 36. Thus, the distance 46 denotes the spacing between the plane which includes the point 58 and the plane which includes the point 60; these planes are normal to the plane of FIG. 1 and parallel to the aforementioned plane including the axis 36 and being normal to the plane of FIG. 1.

The distance 50 between the point 64 of the edge face 24 bounding the window section 16 and the tip 62 of the projection 32 matches of approximates the distance 46 between the innermost point 60 of the edge face 24 bounding the window section 14 and the tip 58 of the projection 28 at the plane of the axis 36. The same holds true for the distances 48 and 52, i.e., the height of the projection 26 can match or approximate the height of the projection 30. The distance 48 is that between the outermost point 54 of the edge face 24 bounding the window section 14 and the tip 56 of the projection 26, and the distance 52 is that between the outermost point 68 of the edge face 24 bounding the window section 16 and the tip 66 of the projection 30 (all as measured at right angles to the axis 36).

The broken lines 70 and 72 denote the crests of projections provided in conventional plates in lieu of the projections 28, 32 shown in FIG. 1 and forming part of the improved plate 10. An advantage of the illustrated projections 28 and 32 is that, when the plate 10 is pivoted in the direction of the arrow 38 (i.e., toward the inner side of the link chain employing links having plates of the type shown in FIG. 1) with reference to the neighboring plate (not shown in FIG. 1), the extent of such pivotal movement is limited to a predetermined or preselected value. The pivotal movement takes place about an axis which is defined by a pair of coupling elements (such as the pin-shaped coupling elements 112, 114 shown in FIG. 3) in the section 14 or 16 of the window 12.

The distance 46 shown in the lower left-hand portion of FIG. 1 (i.e., the height of that side of the projection 28 which is adjacent the window section 14) and/or the distance 48 (i.e., the height of the projection 26 between the window sections 14, and 16) is preferably selected in such a way that it equals at least 30%, preferably at least 45% or at least 60% or at least 75% or at least 85% or more than 100% of the distance between the points 60, 54, 64, 68 (which respectively correspond to distances 46, 48, 50, 52) from the axis 36. As shown in FIG. 1, the tips 56, 58 of the projections 26, 28 do not touch each other (note the constriction 20), and the same holds true for the tips 62, 66 of the projections 30, 32 (note the constriction 22).

Figure 2:
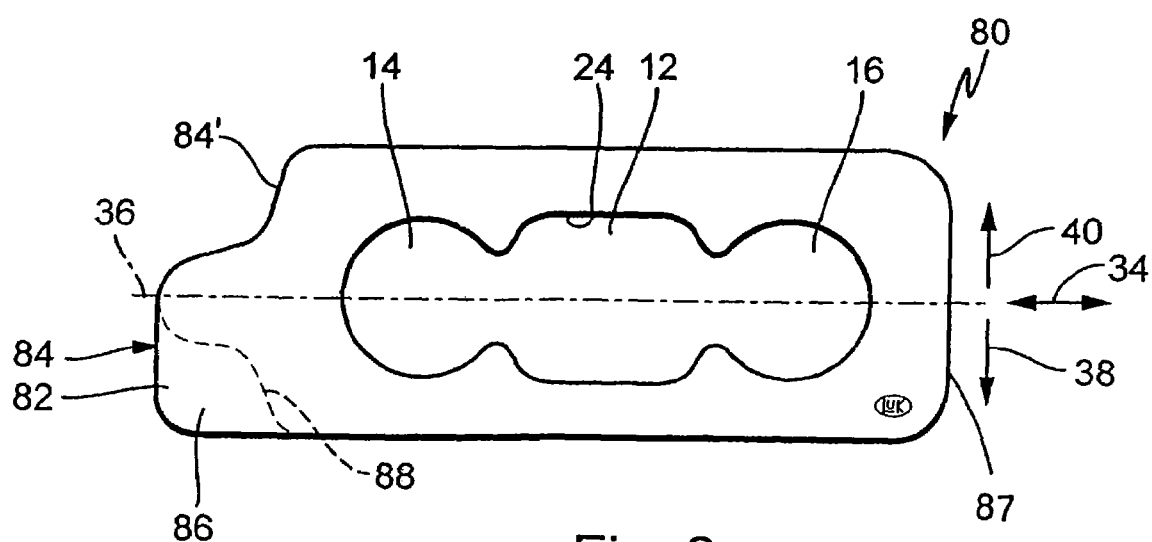
FIG. 2 is a similar plan view of a modified plate having a window and an outline different from those of the plate shown in FIG. 1.

FIG. 2 shows a link plate 80 which can be put to use in the improved link chain in lieu of or in combination with plates 10 of the type shown in FIG. 1. The plate 80 is provided with an elongated window 12 having spaced-apart sections 14, 16 each of which can receive a coupling unit composed of two elongated pin-shaped coupling elements such as or corresponding to the aforementioned elements 112, 114 shown in FIG. 3 and serving to articulately connect the plate 80 with one or more similar plates (not shown in FIG. 2) of the respective link of a link chain employing plates 80 of the type illustrated in FIG. 2 in lieu of or in combination with plates of the type shown (at 10) in FIG. 1.

The configuration of the median section of the window 12 shown in FIG. 2 departs from that of the median section 18 of the similarly referenced window in the plate 10 of FIG. 1. However, it is possible to configurate such median section in the same way as shown (at 18) in FIG. 1 or in a manner as known from conventional link plates.

The left-hand end portion of the elongated plate 80 is provided with a protuberance or extension 82 which is obtained, e.g., by removing some material at the opposite side of the plane including the axis 36. The protuberance is adjacent the left-hand end face 84 of the elongated substantially rectangular plate 80 and extends in the direction of the double-headed arrow 34, i.e., in the direction of movement of the link including the plate 80 when such link is assembled with numerous additional (similar or dissimilar) links to form part of a link chain which transmits torque between flanged pulleys of a continuously variable transmission or the like.

The protuberance 82 is located at the inner side (note the arrow 38) of the link chain employing the plate 80 of FIG. 2, i.e., the protuberance forms part of that elongated portion of the plate 80 which is located at the inner side of the link chain-employing plates 80 of the type shown in FIG. 2.

The broken line 88 denotes in FIG. 2 the outline of the left-hand end portion of a modified plate wherein the protuberance 82 is omitted. The thus obtained centrally disposed protuberance has two halves which are mirror images of each other with reference to a plane including the axis 36 and being normal to the plane of FIG. 2.

The protuberance 82 can cooperate with the adjacent coupling elements (such as the elements 112, 114 shown in FIG. 3) to constitute therewith a so-called antijam device which prevents movements of the plates 80 being articulately connected to each other by two coupling elements or pins 112, 114 from assuming (second) positions from which the two plates cannot pivot back to predetermined positions, namely to positions in which the two plates are in substantially linear alignment with each other (as seen in the direction of the axis 36). As will be fully described with reference to FIGS. 3 and 4, the protuberance 82 can cooperate with one of the coupling elements or pins 112, 114 in the section 14 of each window 12 in the adjacent stack (link) of plates 80 to serve as an antijam device or as a device for limiting the extent of pivotability of two neighboring links of the chain relative to each other. Still further, the protuberance 82 can form part of a position restoring device which confines the coupling elements 112, 114 of at least one coupling unit to return movement a least close to a preselected position relative to each other and relative to the respective pair of links (stacks of plates 10 and/or 80) upon completion of clockwise and counterclockwise pivotal movements of such pair of links.

Figure 3:
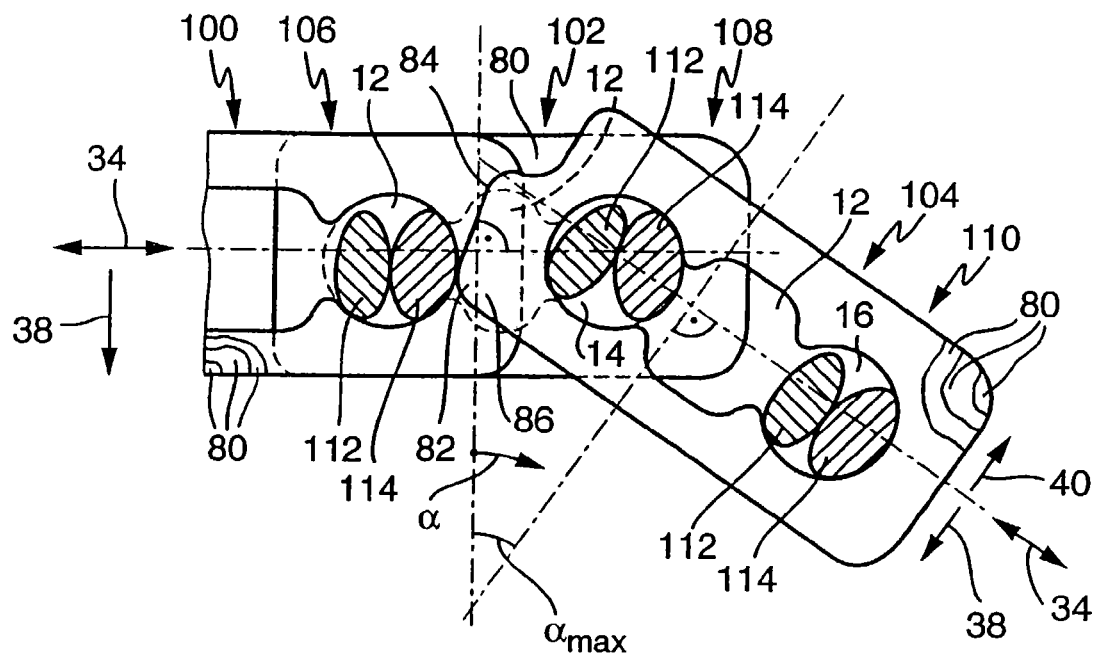
FIG. 3 is a fragmentary partly elevational view of three composite links forming part of a link chain wherein the links are assembled of plates of the type shown in FIG. 2, and a sectional view of composite coupling units which articulately connect the neighboring links to each other.

FIG. 3 illustrates a portion of one embodiment of a link chain which is constructed and assembled in accordance with one presently preferred embodiment of our invention. This chain comprises a series of stacks of elongated plates (including those shown at 100, 102, 104) which are coupled to each other for movement in the longitudinal direction (indicated by the double-headed arrow 34) of the link chain.

Neighboring plates 100 and 102, 102 and 104, etc. are articulately connected to each other by coupling units 106, 108, 110, etc. in such a way that the plates can pivot relative to each other about axes which are normal to the plane of FIG. 3, i.e., normal to the planes of the plates 100, 102, 104, and so forth.

Each of the coupling units 106, 108, 110, and so forth comprises a pair of adjacent parallel non-circular rod-shaped or pin-shaped coupling elements 112, 114 (hereinafer called pins for short), and each pair of such pins is received in the sections 14 or 16 of the windows 12 in the respective plates 80 of the corresponding pair of neighboring links (such as 100, 102 or 102, 104 or 104 and the next-following composite link of the chain and so forth). The pins 112, 114 of each of the coupling units 106, 108, 110, etc. can but need not have identical cross-sectional outlines. Furthermore the outline (geometry) of the pin 112 in the coupling unit 106 can be identical with that of the pin 114 in the coupling unit 106 but the outline of the pin 112 and/or 114 in the coupling unit 106 can be different from that of the pin 112 and/or 114 in the coupling unit 108 and/or 110, etc.

All plates 80 of the link 100 can but need not be identical, and this also applies for the plates of the link 102 and/or 104, etc. Furthermore, the plates 80 of the link 100 may but need not be identical with the plates of the link 102 and/or 104. This holds true for the dimensions as well as for the configurations of plates 80 in a given link or of plates in neighboring (different) links.

At least one plate 80 of the link 100 and/or 102 and/or 104, etc. can be provided with a projection 82 of the type shown in FIG. 2 or with an equivalent (e.g., similar) projection (such as the projection having an outline indicated in part by the broken line 88 shown in FIG. 2).

The coupling units 106, 108, 110 permit limited clockwise and counterclockwise pivotal movements of the respective chain links 100, 102, 104, etc. relative to each other. The axes for such pivotal movements are defined by the respective pairs of pins 112, 114 in cooperation with the surfaces (edge faces) bounding the respective sections 14, 16 of the windows 12 provided in the plates 80. The pins 114 cooperate with the adjacent protuberances 82 and such protuberances cooperate with the surfaces or edge faces bounding the respective window sections to enable the pins, the protuberances and such edge faces to perform additional important functions such as the aforementioned antijamming function, limiting the extent of pivotal movements of links of pairs of links relative to each other and position restoring functions.

As concerns the function of limiting the extent of pivotal movements, the protuberance 82 of a link 100, 102 or 104 ensures that the pivoting of two neighboring links relative to each other from a starting position of at least substantial alignment (see also FIG. 9) with each other in the direction of arrow 34 cannot exceed the angle $\alpha_{max}$, at least in a direction as seen clockwise in FIG. 3. In this Figure, the links 100, 102 are in exact longitudinal alignment with each other, i.e., such links dwell in their starting angular positions relative to each other. On the other hand, the links 102 and 104 make an angle $\alpha_{max}$. In FIG. 3, the angle $\alpha_{max}$ is close to 40°; such angle cannot be exceeded because the protuberance 82 abuts the pin 114 of the adjacent coupling unit 106 which is provided to establish an articulate connection between the links 100 and 102.

The angle $\alpha_{max}$ is flanked by a straight line which is normal to the longitudinal direction of the (pivoted) link 104 and a straight line normal to the longitudinal direction of the link 102 which is directly coupled to the link 104.

The protuberance 82 can further serve to ensure that, subsequent to pivoting from the starting positions of exact or nearly full longitudinal alignment (see the links 100, 102 of FIG. 3 and the links shown in FIG. 9), the two coupling elements 112, 114 which were caused to change their orientations while the links were pivoted away from such alignment (e.g., during travel around a pulley or the like) can return to or close to their starting positions, not only relative to each other but also relative to the respective links (such as the links 102, 104 of the chain portion shown in FIG. 3).

Figure 4:
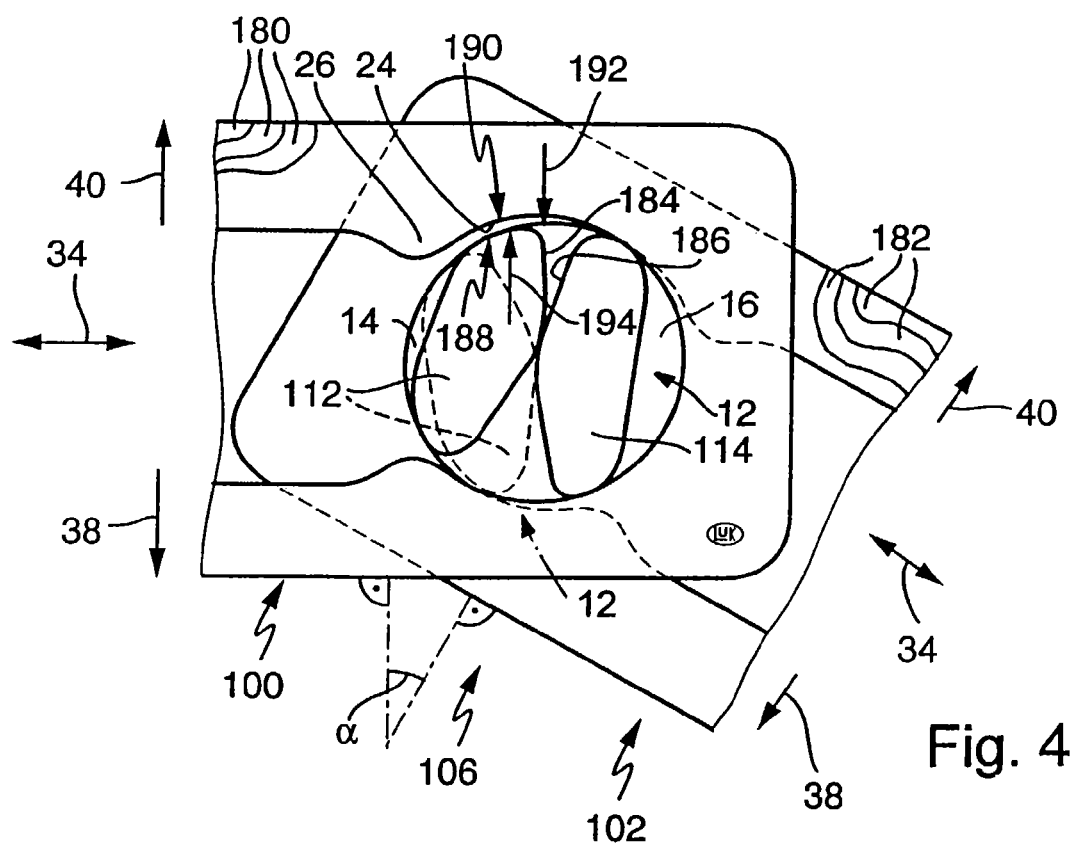
FIG. 4 is a plan view of portions of two links and of a composite coupling unit which articulately connects the two links to each other and employs pins different from those forming part of the coupling units shown in FIG. 3.

FIG. 4 shows two composite links 100, 102 of a link chain which compries a relatively short or a long series of such pairs of links. The links 100, 102 are articulately connected to each other by a coupling unit 106 including two coupling elements or pins 112, 114. The link 100 comprises a stack of plates 180, and the link 102 comprises a stack of plates 182 which alternate with and partially overlap the plates 180. The overlapping portions of the plates 180, 182 are pivotally connected to each other by the pins 112, 114 which extend through the sections 14, 16 of windows 12 respectively provided in the plates 180, 182.

The plates 180 may but need not be identical with the plates 182; for example, the outer sides (arrow 40) of the plates 180 can be identical with or different from the outer sides (arrow 40) of the plates 182, and the same holds true for the inner sides (arrows 38) of such plates. For example, at least the outer side of each plate 180 can be different from the outer sides of the plates 182.

The reference characters 184, 186 respectively denote those surfaces or surface portions of the pins 112, 114 which are in rolling contact with each other, i.e., the surface 186 rolls along the surface 184 and/or vice versa when the link 102 is pivoted relative to the link 100. In FIG. 4, the link 102 is shown in a position in which it is inclined relative to the link 100 in a direction (refer to the right-hand arrow 38) toward the inner side of the chain including the links 100, 102 and the coupling units (each of which includes a pair of pins 112, 114) therefor.

The pin 112 is mounted in such a way that it cannot turn relative to the link 102 and its plates 182; this pin is shown (relative to the link 100 and its plates 180) in two different positions which are respectively indicated by solid lines and broken lines. The portion 188 of the external surface of the pin 112 contacts the portions 190 of internal surfaces or edge faces of the plates 180 in certain predetermined angular positions of the link 102 and its plates 182. The arrow 192 indicates the radii of internal curvature of the plates 180 in the regions of contact of such plates with the pin 112. The radius of curvature 192 is approximately or exactly twice the radius of curvature 194 of the external surface 188 of the pin 112.

The external surface 188 of the pin 112 is located in the sections 14 or 16 of the respective windows 12. In the structure which is shown in FIG. 4, the external surface 188 abuts the edge face bounding the section 14 of the window 12 in at least one of the plates 182 adjacent the outer side (arrow 40) of the link chain including the links 100, 102 of FIG. 4. However, this constitutes but one of several different possible or suitable locations of contact between the pin 112 and the plates 180 of the chain link 100 shown in FIG. 4; for example, the pin 112 can contact the plates 180 of the composite link 100 in the region adjacent the inner side (arrows 38) of the link chain. As a rule, the region of contact of the pin 112 will be selected in a manner such that it is nearest to the outer side or the inner side of the improved link chain.

Figure 5:
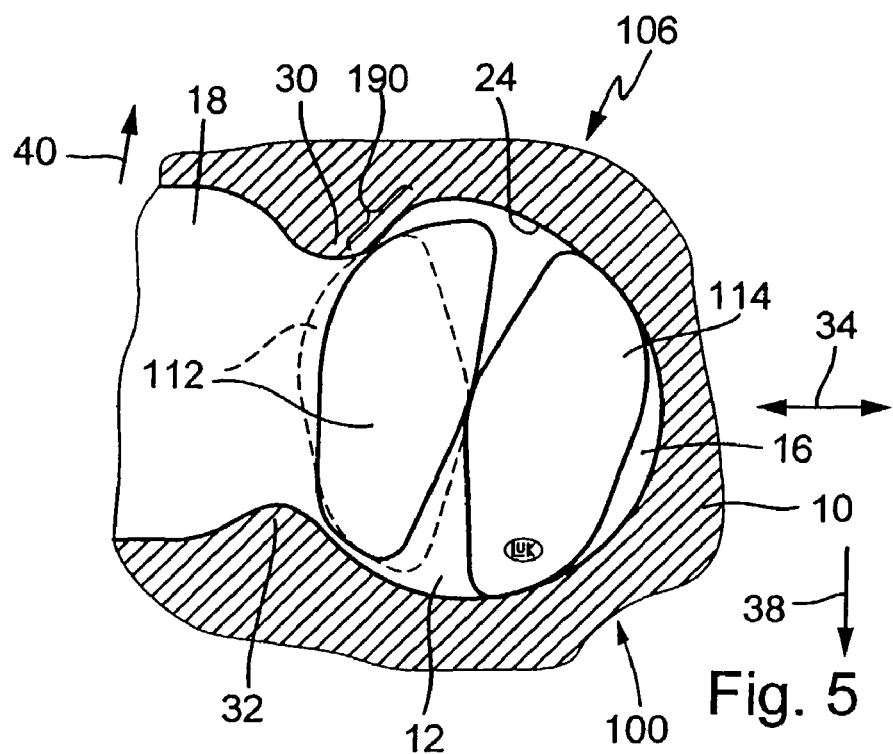
FIG. 5 illustrates a plate constituting a modification of plates of the type shown in FIG. 2, and a composite coupling unit employing pin-shaped elements somewhat similar to those shown in FIG. 4.

FIG. 5 shows two pins 112, 114 in a section 16 of a window 12 provided in a plate 10 of a composite link 100. The pins 112, 114 constitute component parts of a composite coupling unit 106. The pin 112 is shown in two different positions; one of these positions is shown by solid lines and the other position is indicated by broken lines. When the angular position of the plate 10 (i.e., of the link 100) relative to the plates of the adjacent link (such as the plates of the link 102 shown in FIG. 3) is changed from one end position to the other end position, the pin 112 moves (turns) from the solidline poition to the broken-line position of FIG. 5 or vice versa.

The edge face 24 bounding the window 12 of the plate 10 shown in FIG. 5 includes two convex portions bounding the projections 30, 32 which partially separate the window section 16 from the median window section 18. The region of contact between the pin 112 and the edge face 24 at the projection 30 is indicated by the reference character 190. However, it is also possible to configure the pin 112 and the edge face 24 in such a way that the pin 112 contacts the plate 10 in the region of the projection 32, namely at the radially inner side 38 of the link chain embodying the structure shown in FIG. 5. The region 190 of the edge face 24 at the projection 30 bounds that portion of this projection which limits the extent of movability of the pin 112 in the directions (double-headed arrow 34) of lengthwise movement of the link chain including the parts shown in FIG. 5.

It is desirable to select the various projections, protuberances, internal edge faces, radii of curvature and other parameters of the plates forming part of the links and of the coupling elements in such a way that the links of each pair of pivotally coupled links cannot jam in angular positions in which they cannot reassume their positions of linear alignment, for example, when the link chain is installed in such a way that it includes two or more vertical or substantially vertical stretches or reaches wherein the neighboring links are free to assume positions of alignment so that the just mentioned stretches remain straight or are free to become straight. This is desirable and advantageous if one is to ensure predictable transmission of torque between the rotary parts over which the improved chain is trained.

Figure 6:
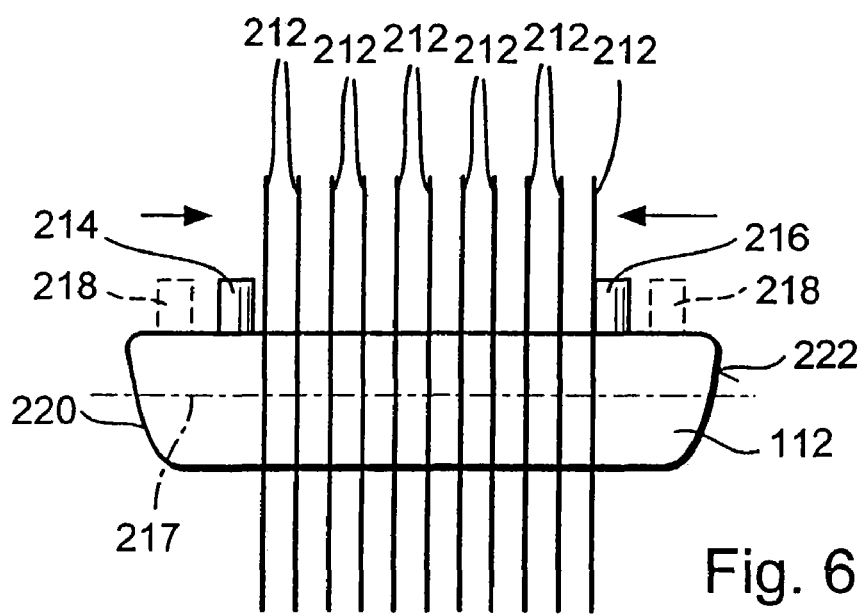
FIG. 6 is an elevational view of a pin and a schematic view of two links which are traversed by the pin and are secured against rattling in accordance with one presently preferred embodiment of the invention.

FIG. 6 illustrates a pin 112 which extends through the windows of a twin stack of plates 212 together forming two links of a link chain. The character 217 denotes the longitudinal axis of the pin 112, and the characters 220, 222 denote the substantially convex end faces or cam faces which contact the conical flanges of pulleys or sheaves one of which drives and another of which is driven by the endless link chain in a CVT transmission or the like. Reference may be had, for example, to FIG. 2 of the aforementioned U.S. Pat. No. 4,927,404 to Rattunde or to FIG. 5 or the aforementioned U.S. Pat. No. 5,728,021 to van Rooij et al. The chains which are disclosed in these patents are intended for use in CVT (cone pulley) transmissions.

The pin 112 is provided or cooperates with two stops 214, 216 which limit the extent of movability of plates 212 sideways, i.e., in the direction of the axis 217 of the pin. The positions of the stops 214, 216 are or can be selected in such a way that the play which is provided for the plates 212 in the direction of the axis 217 does not exceed a preselected value, for example, a value of between 0.02 mm and 0.01 mm, preferably between 0.005 mm and 0.002 mm.

The stops 214, 216 are applied upon completion of insertion of the pin 112 through the registering window sections of the two stacks of alternating plates 212 forming part of a pair of articulately connected composite links. Each of these stops is or can be immediately adjacent the outermost plate 212 of the respective stack. The distance of the two stops 214, 216 from each other is or can be selected individually, i.e., in dependency upon the combined thickness of the two stacks of plates 212. Such mode of assembling the pin 112 with the two stacks of plates and with the stops 214, 216 renders it possible to account for manufacturing tolerances, i.e., for eventual departures of the thickness of the one and/or the other stack of plates 212 from a predetermined thickness. It is highly desirable to ensure that the play between the neighboring plates 212 of each stack remain within (i.e., not exceed) a preselected value, e.g., within one of the aforementioned ranges. The stops 214, 216 can be welded, otherwise bonded or mechanically affixed to (e.g., threaded into) the respective end portions of the pin 112.

The broken lines 218 indicate in FIG. 6 the positions which the stops 214, 216 would assume or would be likely to assume if their positions were selected independently of the actual combined thickness of the two stacks of plates 212 on the pin 112. This could result in excessive lateral play of individual plates 212. The placing of stops 214, 216 at a preselected distance from each other (e.g., at the distance corresponding to that between the two stops denoted by broken lines and identified by reference characters 218) is a procedure which is practiced in connection with conventional link chains and exhibits the above-enumerated drawbacks.

It has been found that the placing of the stops 214, 216 at a distance from each other which corresponds to the actual combined thickness of two stacks of plates 212 plus a predetermined maximum play contributes to longer useful life and to greater reliability of the structure (such as a CVT transmission) in which the improved chain is being put to use. The stops 214, 216 act primarily as abutments for the adjacent outermost plates 212, i.e., such stops determine the extent of movability of neighboring plates 212 relative to each other and the distance between such stops is a function of the thickness of individual plates, the combined thickness of all plates in the respective links and the finish of neighboring surfaces. It is further desirable to ensure that the distance between the stop 214 and the nearer end face 220 of the pin 212 equal or at least closely approximate the distance between the pin 216 and the other end face 222 of the pin 212. The end faces 220, 222 abut the normally conical surfaces of flanges forming part of pulleys or sheaves over which the chain is trained when utilized in the power train of a motor vehicle, e.g., in a CVT transmission.

Figure 7:
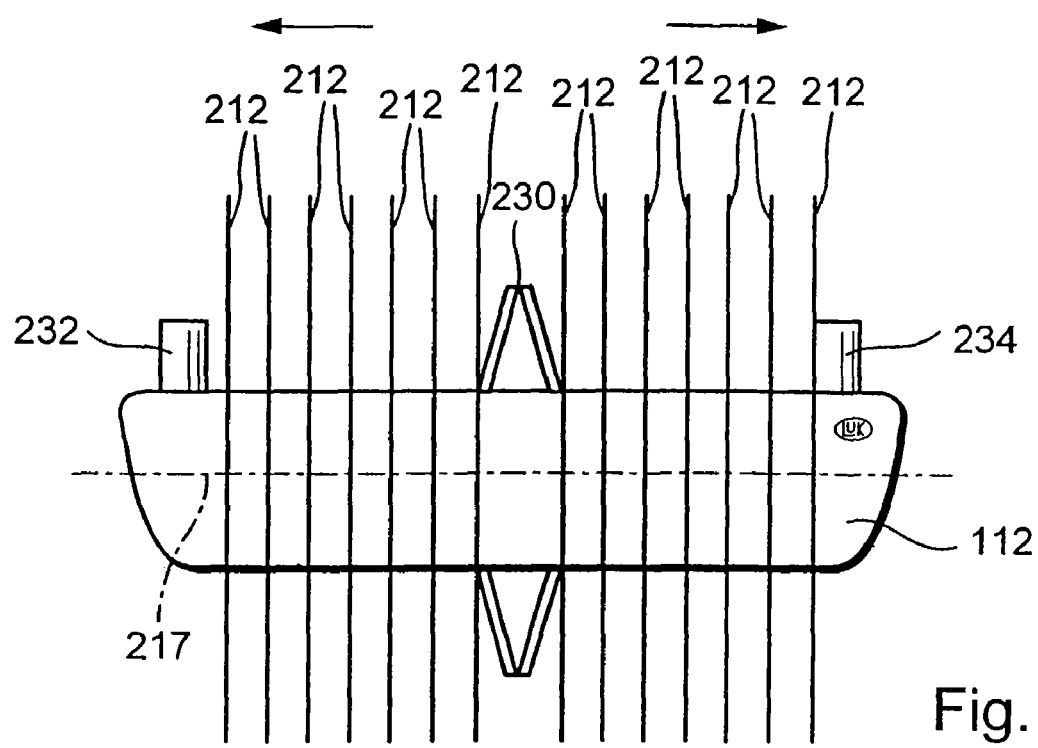
FIG. 7 is a view similar to that of FIG. 6 but showing different means for determining the play between plates forming part of two chain links traversed by a pin-shaped element of the unit which articulately connects the two links to each other.

FIG. 7 illustrates a feature which can be resorted to in lieu of (or in addition to) the feature shown in FIG. 6. Thus, the coupling element or pin 112 carries two stops 232, 234 which are spaced apart from each other (as seen in the direction of longitudinal axis 217 of the pin) a distance exceeding the combined thickness of the two stacks of plates 212. The resulting slack is taken up by two diaphragm springs 230 which surround the pin 212 and are disposed between two selected plates 212 (FIG. 7 shows the diaphragm springs 230 between the two centrally located plates 212). The stops 232, 234 can be welded (or otherwise bonded) and/or mechanically secured to (e.g., received in tapped bores of) the pin 112.

The diaphragm springs 230 constitute but one of several types of biasing means which can be utilized to prevent wobbling of the plates 212 on the pin 112; for example, these springs can be replaced by one or more coil springs, by one or more suitable leaf springs and/or by at least one corrugated spring. An advantage of the embodiment of FIG. 7 and of the aforementioned modifications of such embodiment is that the distance between the stops 232, 234 need not be selected with a degree of precision which is required to select the distance between the stops 214, 216 shown in FIG. 4.

The diaphragm springs 230 of FIG. 7 can be made of spring steel, of elastic plastic material, of any other suitable resilient material, or of a combination of two or more materials including at least one resiliently deformable material.

Figure 8:
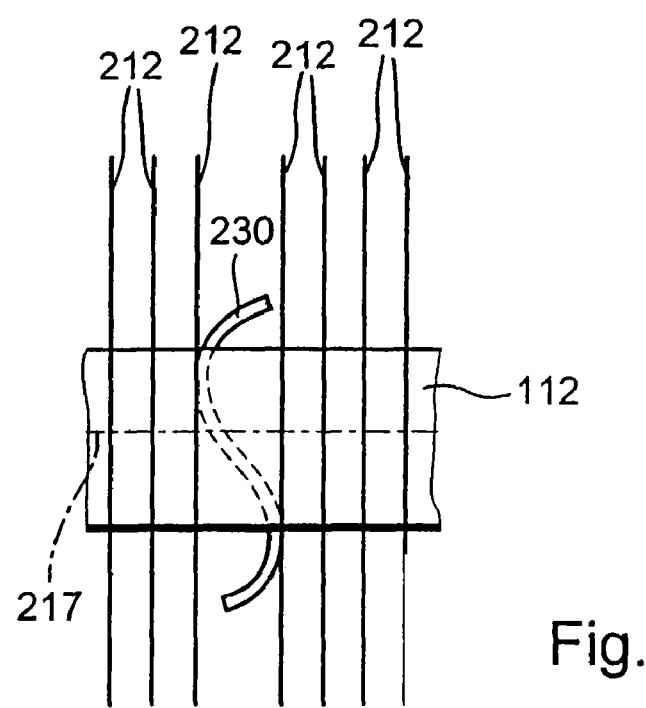
FIG. 8 is a fragmentary elevational view of a pin, of two composite chain links and of play limiting means different from those shown in FIGS. 6 and 7.

FIG. 8 shows a portion of a pin 112, a few plates 212, and a modified biasing means 230 which can be utilized in lieu of the diaphragm springs 230 shown in FIG. 7. The biasing means 230 is or includes a substantially S-shaped leaf spring which can but need not be traversed by the pin 112. For example, the link chain embodying the structure of FIG. 8 can employ two or more S-shaped springs which are installed between the two centrally located plates 212 and urge two groups of plates 212 away from each other, namely toward two stops of the type shown at 232, 234 in FIG. 7. The spring 230 can be utilized as one element or component of a composite biasing means further utilizing one or more diaphragm springs (230) and/or other suitable resilient parts. It is often sufficient to employ a single resilient element for each pin 112.

FIG. 9 illustrates two composite links 100, 102 of a novel link chain in positions of alignment, namely the inner and the outer longitudinal marginal portions of these links make an angle which is or which closely approximates zero. These positions are not end positions of the links 100 and 102, i.e., such links can pivot relative to each other to outer end positions which are shown in FIG. 10 and in which the link 100 and/or 102 has been pivoted (in the direction of the respective arrow 40) from the position of FIG. 9 through a relatively small acute angle $\alpha_{max\ outward}$. This angle is the maximum angle through which the links 100, 102 can pivot relative to each other or through which one of these links can pivot relative to the other link from the position(s) shown in FIG. 9. Analogously, a relatively large angle $\alpha_{max\ inward}$ is the maximum angle through which the link 100 and/or 102 can be pivoted (in the direction(s) indicated by the arrow(s) 38) to assume the position(s) shown in FIG. 11.

The links 100, 102 respectively comprise packages or stacks of plates 268, 266. Portions of the plates 266 overlie portions of the plates 268 and the plates 266 alternate with the plates 268. The link 102 is articulately connected with the link 100 by a coupling unit 108 including a pair of transversely extending coupling elements or pins 260, 262. The right-hand end portion of the link 100 is articulately connected with a further link (not shown) by a coupling unit 110 including a pair of parallel coupling elements or pins (one of these pins is denoted by the reference character 260'), and the left-hand end portion of the link 102 is articulately connected to an additional composite link (not shown) by a coupling unit 106 which is or which can be identical with the coupling unit 108 or 110.

The pins of the coupling units 106, 108, 110 extend through sections of windows 264 which are provided in the links 100, 102 (i.e., in the plates 268, 266 of such links), and the edge faces 282 bounding such windows can be configurated, for example, in a manner as shown in and as already described with reference to FIG. 1 or 2. When the link 100 and/or 102 pivots (at 108) relative to the other link, at least one of the pins 260, 262 rolls along the adjacent pin and/or along the adjacent portion(s) of edge face(s) 282 of one or more plates of at least one stack of plates.

The plates 266, 268 of the respective links 102, 100 are provided with projections 274, 276, 278, 280 which extend into the respective windows 264 and cooperate with each other to define constrictions 270 (between the projections 274, 278) and 272 (between the projections 276, 280). The pin 260 and/or 262 of at least one of the coupling units 106, 108, 110 can be affixed to the plates 266 and/or 268 of the respective link 100 or 102; such affixed pins 260 or 262 are adapted to roll relative to the immediately adjacent pins 262 or 260; the arrangement is or can be such that the pins 260, 262 of the coupling units 106, 108, 110 establish at least some play (see the play 284) between themselves or with the adjacent portions of the respective edge faces 282, at least in certain angular positions of neighboring links (such as 100, 102) relative to each other and/or at predetermined portions of the edge faces bounding the respective sections (such as the sections 14, 16 shown in FIG. 1 or 2) of the windows 264.

The presence of play (such as 284) between the edge faces 282 of a stack of plates (such as 266 or 268) and the adjacent portion(s) of the pin(s) 262 and/or 264 (when the links 100, 102 assume the positions (FIG. 9) of linear alignment) is not always necessary. Thus, it is within the purview of the invention to configurate the pin(s) 260 and/or 262 and/or the edge faces 282 adjacent the pins in such a way that there is no play (284) between the external surfaces of the pins and the adjacent portions of the edge faces 282 when the links 100, 102 assume the aligned (predetermined) positions of FIG. 9 but the links are still free to be pivoted relative to each other (at 108) to the positions shown in FIG. 10 or 11 in which these links make one of the angles $\alpha_{max\ inward}$ or $\alpha_{max\ outward}$.

The configurations of the external surfaces of the pins 260, 262 and/or the plates 278, 280 and/or the projections 274, 276, 278, 280, and particularly the internal edge faces 282 are preferably such that, when the link 100 and/or 102 is pivoted (outwardly) in the direction of the respective arrow 40, at least one of the pins 260, 262 comes into abutment with the link which is movable relative thereto when the angle $\alpha$ reaches the predetermined maximum value (such as $\alpha_{max\ outward}$). In other words, once such angle is reached, it cannot be increased beyond that shown in FIG. 10 (i.e., the links 100,102 cannot pivot counterclockwise from the angular positions of FIG. 9 beyond those shown in FIG. 10.

The pins 260, 262 can abut a projection 276 of the respective plate, i.e., a selected portion of the edge face 282 of such plate, with the result that the play 284 at the respective portion of the edge face 282 is reduced to zero.

The extent of pivotal movement of two articulately connected links in the direction of arrow(s) 38 to the end position(s) shown in FIG. 11 is limited by the protuberances 82 in a manner as already described with reference to FIGS. 2 and 3. The protuberances 82 form part of the plates 266, 268, and more specifically of the elongated portions 286 of such plates.

The following is a detailed description of the manner in which the extent of pivotal movements of the links 100, 102 relative to each other is limited starting from the positions shown in FIG. 9 and proceeding to those shown in FIG. 10 (i.e., counterclockwise) and starting from the positions shown in FIG. 9 or 10 and proceeding to those shown in FIG. 11 (i.e., clockwise):

FIG. 10 shows the link 100 in an angular position which is reached by this link upon completion of counterclockwise angular movement (see the right-hand arrow 40) through the angle $\alpha_{max\ outward}$; this involved a rolling of the surfaces 300, 302 of the pins 260, 262 of the coupling unit 108 along each other. More specifically, the surface 302 was caused to roll along the surface 300. Such rolling entailed a change of the extent of play 284 between the pin 260 and the adjacent portion of the edge face 282 in the region of projection 276 of the illustrated plate 266. The just mentioned region extends between the end portion 304 of the pin 260 (see FIG. 9) and the portion 306 of the projection 276.

When the illustrated plate 268 completes its angular movement from the position of FIG. 9 to that which is shown in FIG. 10, the aforementioned play 284 is reduced to zero or close to zero; thus, the pin 260 of the coupling unit 108 abuts the projection 276 and the pivoting of the plate 268 in a counterclockwise direction (note the right-hand arrow 40 in FIG. 10) comes to an end. The projection 82 of the plate 266 is at least substantially free (inactive) not later than when this plate reaches the angular position of FIG. 10 (i.e., when the inclination of the plate 268 relative to the plate 266 reaches the angle $\alpha_{max\ outward}$ at such time, the projection 82 of the plate 266 does not abut an adjacent portion of the plate 268.

In order to reach the angular position of FIG. 11, the plate 268 must be pivoted through the relatively large angle $\alpha_{max\ inward}$ starting from the angular position shown in FIG. 10 or through an even larger angle $\alpha_{max\ outward} + \alpha_{max\ inward}$ starting from the angular position of FIG. 9.

When the plate 268 reaches the angular position of FIG. 11, the play 284 between a predetermined location or in a predetermined region between the pin 260 of the coupling unit 108 and the edge face 282 bounding the window 264 of the plate 266 shown in FIG. 11 reaches a predetermined value. More specifically, this play develops between an end portion 304 of the pin 260 and the portion 306 of the projection 276 of the plate 266 or the entire edge face 282 or the entire projection 276. Eventually developing play-free regions between the inner edge face 282 and the pin 260 serve primarily the purpose of guidance. In the embodiment of FIGS. 9 to 11, the pivotability of the links 100, 102 relative to each other is not limited or impeded due to cooperation of the pin 260 with the edge face 282 of the plate 266 (i.e., the link 102) when the links 100, 102 are pivoted relative to each other (at 108) in the direction(s) of arrow(s) 38, i.e., toward the angular positions shown in FIG. 11.

When the links 100, 102 reach the mutual angular, positions of FIG. 11, further pivoting in a direction to increase the angle $\alpha$ beyond the value $\alpha_{max}$ inward is prevented (blocked) by the pin 260' of the coupling unit 110 in cooperation with the adjacent projection 82. Such cooperation between the pin 260' and the projection 82 is effected in the aforedescribed manner, preferably by causing the projection 82 to abut the pin 260'.

The pin 260' of the coupling unit 110 (i.e., that pin which limits a clockwise (see the right-hand arrows 38 in FIGS. 10 and 11) pivoting of the plates 268 relative to the plates 266 beyond the angular positions (angle $\alpha_{max\ inward}$) shown in FIG. 11) differs from the pin 260 of the coupling unit 108, i.e., from the pin which limits the extent of pivotal movement in the direction indicated by the right-hand arrow 40 shown in FIG. 10. These two pins extend through the respective sections of the windows 264 of the plates 268 forming part of the link 100; the pin 260' forms part of the coupling unit 110, and the pin 260 forms part of the coupling unit 108.

The pin 260' cooperates with the adjacent projection 82 whereas the pin 260 cooperates with the adjacent portion of the edge face 282 of the plate 268. This mode of operation of the pairs of coupled-together links (such as the links 100, 102 shown in FIGS. 9 to 11) further serves to ensure that, once the links have completed a back-and-forth pivotal movement, they reassume their initial positions relative to each other. Furthermore, in lieu of or in addition to the just outlined feature (return movement to predetermined or preselected initial positions), the links 100, 102 do not jam during pivoting between their end positions (such as those shown in FIGS. 10 and 11).

As utilized herein, the term jamming is intended to denote that the pairs of pins 260 (260'), 262 belonging to any one of the coupling units 106, 108, 110 turn in unison relative to the adjacent links 100, 102 while the pairs of pins carry out their back-and-forth movements. Thus, when they complete a "forth" movement, the pairs of pins 260 (260'), 262 jointly reach and dwell in positions which are angularly offset relative to the positions reached upon completion of a "back" movement.

Referring again to FIG. 2, the reference character 84' denotes a recessed portion of the left-hand end face 84 of the plate 80, and the reference character 86 denotes the elongated innermost portion of the plate 80. The protuberance or extension 82 forms part of the elongated portion 86.

At least some links of the improved chain can have a pitch which equals or exceeds 9 mm. As used herein, the term "pitch" denotes the spacing of the links from center to center; more specifically, this term denotes the distance of two neighboring pivot axes from two neighboring coupling units. It is preferred, in accordance with the invention, to select (as seen in the directions (arrows 34) of movement of the improved link chain) the pitches of several successive links in such a way that they equal or exceed approximately 5 mm but are less than 15 mm. A presently preferred arrangement is such that a link having a pitch which equals or exceeds 5 mm but is less than 15 mm is flanked by links having smaller pitches, preferably pitches of about 9 mm. It is often of particular advantage to utilize a chain wherein the links have pitches of between 6.5 mm and 8.5 mm or pitches of between 9 mm and 12 mm. It is also within the purview of this invention, and often highly advantageous and desirable, to assemble the improved chain of links having more than two different lengths.

The aforediscussed means for limiting the extent of pivotability of links of pairs of neighboring links relative to each other is preferably designed, or can be designed, in such a way that the maximum angle $\alpha$ between a link having a pitch matching or greater than 9 mm and one or both links which are adjacent thereto is less than 35°, preferably less than 30°. In accordance with a presently preferred embodiment, the angle is less than 28°, most preferably between 21° and 28°. Still further, it is advisable to select the maximum angle of pivotability of two interconnected neighboring links in such a way that the maximum angle is a function of the pitches of such links and/or a function of the radii of the pulleys over which the link chain is trained in actual use.

As already explained hereinbefore, one normally distinguishes between two maximum angles, namely the angle $\alpha_{max\ outward}$ (note the arrows 40 in FIG. 10) and the angle $\alpha_{max\ inward}$ (see the arrows 38 in FIG. 11). The neutral angular positions (in which the (positive or negative) angle $\alpha$ is zero) of the links of a pair of neighboring links are those shown in FIG. 3 (between the links 100 and 102) and in FIG. 9 (between the links 100 and 102).

However, it is also within the purview of our present invention to provide the improved link chain with means for limiting solely the magnitude of the angle $\alpha_{max}$ inward or only that of the angle $\alpha_{max\ outward}$.

The cross-sectional outlines of the pins (such as the pins 112, 114 shown in FIG. 4) can be selected in such a way that these outlines are asymmetric in the planes of the respective links. This can hold true for all coupling elements or for one or more selected coupling elements. In other words, all of the coupling units (such as the units 106, 108, 110 shown in FIGS. 9 to 11) may but need not employ identical pins.

As already mentioned hereinbefore, the pins of all coupling units may but need not be identical. This also holds true for the links. For example, certain links of the novel chain can employ plates (such as 80) provided with protuberances of the type shown at 82 in FIG. 2, and certain other links can employ plates 10 of the type shown in FIG. 1. It is also possible to provide at least some of the plates with protuberances which are adjacent the outer side of the chain; this can necessitate some changes in the configuration(s) of the cross-sectional outline(s) of one or both pins of the neighboring coupling element(s) and/or at least some changes in the configuration of the neighboring plates.

The directions (arrows 34) of forward and rearward movements of the chain are determined by the direction in which the driving pulley of the transmission employing the improved chain is rotated.

It will be recalled that the protuberances (such as 82) of the plates (80) forming part of at least some of the links can perform a single function (such as limiting the angle $\alpha_{max}$ in one or both directions, see FIGS. 10 and 11), or several functions, e.g., the additional (antijamming) function of ensuring that neighboring links can reassume the positions of alignment with each other (reference should be had again to FIG. 9), for example, after they leave one pulley and begin to advance (along a straight path) toward another pulley of a continuously variable transmission.

Referring again to FIG. 2, it will be seen that the width of the left-hand end portion of the plate 80 (adjacent the end face 84) exceeds the width of the right-hand end portion, primarily at the inner side, (arrow 38) of the chain. Thus, the distance between the end face 84 and the nearest part of section 14 of the window 12 is more than twice the distance between the right-hand end face 87 and the nearest part of the window section 16. In other words, the left-hand part of the plate 80 is not a mirror image of the right-hand part. Furthermore, the width of that portion of the plate 80 which extends between the section 14 of the window 12 and the end face 84 varies due to the provision of the recess (at 84') in the end face 84.

In accordance with a modification which is not shown in the drawings, the leftmost part of the plate 8Q shown in FIG. 2 can be provided with at least two protuberances, e.g., with a first protuberance (82) at the inner side (as actually shown in FIG. 2) and with a second protuberance at the outer side of the plate 80. The outer protuberance can serve to prevent excessive pivoting of the link including the just described modified plate outwardly beyond a position of alignment with the plates of neighboring links after it advances beyond a pulley to form part of a straight elongated stretch of the link chain (on its way toward another pulley of the transmission). The outer protuberance is then caused to strike an adjacent pin or a suitable (such as complementary) portion of a plate forming part of a neighboring (immediately preceding or immediately following) link. The protuberance (such as 82) at the inner side of the link plate 80 normally serves to limit the extent of pivoting of the respective link in the direction of arrows 38 (toward the position of the plate 268 shown in the right-hand portion of FIG. 11).

At least one of the just discussed twin projections (on a modified plate 80) can also serve to prevent excessive pivoting of the respective pair of links relative to each other subsequent to advancement beyond a pulley.

As already explained with reference to FIG. 4, it is advisable to properly select the ratio of the radii of curvature of rounded surfaces forming part (a) of at least one of the pins 112, 114 and (b) of the edge face 24. Thus, the ratio of the radius of curvature 192 of the rounded portion of edge face 24 and the radius of curvature 194 of the rounded surface 188 of the pin 112 can be less than 10:1, preferably less than 8:1 and even more preferably less than 6:1. In fact, it is often desirable to select a ratio which is less than 5:1, less than 3:1, and even less than 2:1. A ratio of 2:1 (i.e., the radius of curvature 192 is twice the radius of curvature 194) has been found to be particularly satisfactory in many types of link chains for use in the CVT transmissions of power trains in motor vehicles.

It will be appreciated that the rounded surfaces of the plates 180 and of the pin. 112 need not be in uninterrupted contact with each other; however, it is also possible to configurate the pin 112 and the adjacent plates 180 in such a way that their rounded surfaces contact each other in all permissible or possible angular positions of the links 100 and 102 of FIG. 4 relative to each other.

The radii of curvature of contacting rounded surfaces on the pin 112 and the plates 180 may but need not be constant. For example, at least one of the rounded surfaces can have a gradually changing radius of curvature. Furthermore, the aforediscussed ratio of the two radii of curvature can change during pivoting of the pin 112 and the plates 180 relative to each other.

The mutual positions of the external surface of the in 112 and of the adjacent internal surfaces of the plates 180 can be selected in such a way that the stresses which are being transmitted between such surfaces vary, i.e., certain first portions of such surfaces are selected to transmit and/or to take up greater stresses and certain second portions of such surfaces are called upon to transmit or to take up less pronounced stresses. The abutting surfaces of the pin 112 and the plates 180 are or can be selected and designed and configurated to take up and/or to transmit different stresses under different circumstances of use of the link chain.

The surface portions which are called upon to take up critical stresses are provided in part on the pin 112 and in part on the plates 180 of FIG. 4, namely at 190. As a rule, such critical stresses (which develop when the link chain is in actual use) are relatively low stresses. The stresses upon that part of the internal surface of a plate 180 which is not in contact with a pin 112 are or can be lower than in the region of contact with the pin. Those surfaces which take up critical stresses can constitute 50% or 35% or 25% or 20% or preferably only 10% of the respective edge faces 24.

The stops 214, 216 of FIG. 6 are preferably positioned to select a play which is less than 0.2 mm. A play which is less than 0.1 mm, preferably less than 0.05 mm, and often less than 0.02 mm has been found to be quite satisfactory. Such play can be selected to be less than 1 mm and even less than other aforementioned specific plays if the pins 112 and/or 114 are not combined with biasing means of the type shown in FIGS. 7 and 8. The end faces 220, 222 of the pin 112 can but need not be identical. These end faces receive torque from the driving pulley and transmit torque to the driven pulley of a CVT. The configurations of such end faces can greatly depart from those shown in FIG. 6; this depends upon the configuration of the pulleys and/or upon the magnitude of transmitted torque.

Referring again to FIGS. 7 and 8, the resilient biasing means 230 or analogous biasing means can be made of a metallic, of a plastic or of any other suitable resilient material. Alternatively, such biasing means can be made in part of a merely flexible and in part of a resilient material.

It is further within the purview of the invention to employ plates (corresponding to, i.e., performing the functions of the plate 10 of FIG. 1 or the plate 80 of FIG. 2) each of which is provided with two discrete windows, one for each of two coupling units. In other words, the median section 18 of the window 12 in the plate 10 of FIG. 1 or the median section of the window 12 in the plate 80 shown in FIG. 2 can be omitted.

The links of the improved chain can be arranged in the so-called double (twin) or triple side bar arrangement. The meaning of such terms is fully explained in the aforementioned U.S. Pat. No. 5,427,583 to Wolf.

As concerns the construction of the power train which can utilize a transmission embodying the improved link chain, reference should be had again to the aforementioned commonly owned U.S. Pat. No. 5,295,915 (Friedmann) and U.S. Pat. No. 5,711,730 (Friedmann et al.). These patents fully describe the modes of preferably, simultaneously adjusting the driving and driven pulleys, how to automatically adjust such pulleys in order to change the ratio of the transmission, and many other features of a CVT or of a power train which employs a CVT. An advantage of such transmission is that a constant-length link chain can transmit larger or smaller torques and can also drive the torque receiving pulley at any one of an infinite number of different speeds. The CVT can be adjusted mechanically and/or hydraulically and/or electromagnetically and/or otherwise. As a rule, the adjusting means employs a hydraulic system, especially if the CVT is utilized in the power train of a motor vehicle.

The aforementioned US patents to Friedmann and Friedmann et al. also describe and illustrate various torque sensors which are utilized to vary the pressure of hydraulic fluid serving to adjust the pulleys of the CVT. Such transmission can employ a single torque sensor or several discrete torque sensors, for example, one torque sensor for each adjustable pulley of the CVT. Electromagnetic valve or valves can be employed to regulate the pressure of hydraulic fluid in dependency upon the position(s) of the adjustable valving element(s) of the valve(s), and more specifically in dependency upon the amperage of electric current being supplied to the valve.

The mode of operation of the means for adjusting the pulleys of the CVT which employs the improved link chain can be such that the selected transmission ratio remains unchanged, i.e., the static and/or dynamic forces being transmitted between the link chain and the adjustable pulleys cannot change the selected or desired or required transmission ratio which is determined by axial positions of adjustable flanges relative to the axially fixed flanges of the adjustable pulleys. Reference may be had again to the aforementioned US patents to Friedmann and Friedmann et al. as well as to additional US patents dealing with transmissions employing adjustable pulleys or sheaves and a link chain. Such additional patents include, for example, the references cited in the patents to Friedmann and Friedmann et at al., U.S. Pat. No. 5,217,412 granted Jun. 8, 1993 to Indlekofer et al. for "CONTINUOUSLY VARIABLE SPEED TRANSMISSION", U.S. Pat. No. 5,046,991 granted Sep. 10, 1991 to Friedmann for "CONTINUOUSLY VARIABLE SPEED TRANSMISSION", and U.S. Pat. No. 5,725,447 granted Mar. 10, 1998 to Friedmann et al. for "POWER TRAIN WITH INIFINITELY VARIABLE RATIO TRANSMISSION".

The protuberances (such as 82) of certain plates (such as the plate 80 of FIG. 2) can be provided on plates forming part of links which are shorter than the longest links of the improved chain or which are the shortest links of such chain. It is often preferred to provide protuberances only on the longest links of the chain and/or on links having the greatest pitch. The same holds true or the same can apply also for the projections of the plates.

If the improved link chain is constructed in such a way that each of its links is provided with at least one protuberance (e.g., that each plate of each link has at least one protuberance of the type shown at 82 in FIG. 2), the protuberances on the longer links or on links having greater pitches are or can be longer than those on the other links.

It is preferred to select the configuration of those projections and/or protuberances which strike certain parts (such as pins of the coupling units) in predetermined angular positions of a pair of articulately connected links relative to each other in such a way that the protuberances and/or projections are not in a mere point contact with the respective stops (see, for examples the extent of surface-to-surface contact of the pin 114 of the coupling unit 108 in FIG. 3 with the adjacent projections of the plates 80).

The angle $\alpha_{max\ outward}$ between two links of a first pair of links may but need not be identical with such angle defined by another pair of links forming part of the same link chain. The same applies for the other angle $\alpha_{max\ inward}$. Furthermore, and as can be readily seen in FIGS. 9 to 11, the angle $\alpha_{max\ inward}$ need not be identical with (but can greatly depart from) the other angle $\alpha_{max\ outward}$.

The angle $\alpha_{max\ inward}$ can be ascertained or selected to equal or exceed the product of the other angle (i.e., the angle $\alpha_{max\ outward}$) and the quotient of the pitch of a second link or of the respective plates on the one hand and the pitch of the respective second link or the respective plates on the other hand. It is often preferred to select one of the angles $\alpha_{max}$, namely the angle defined by a pair of short or relatively short links, in such a way that it is between 15° and 25°, most preferably between 17° and 21°. The maximum angle between the links of a pair of longer links can be between 20° and 30°, preferably between 22° and 27.5°.

The improved chain can comprise a pair of links, a third link and at least one fourth link adjacent to and being pivotable relative to the third link. The third link comprises at least one third plate, and the fourth link comprises at least one fourth plate which latter is articulately coupled to the third plate, especially by way of a coupling unit which comprises at least one but preferably two pins. At least one pin is caused to move, particularly to turn, at least relative to the third and/or the fourth link, in response to pivoting of the third link relative to the fourth link of such chain. The third link preferably constitutes a first or second link, and the fourth link is also preferably a first or a second link. It is often preferred to assemble the link chain in such a way that the third link constitutes a first or a second link and that the third plate constitutes a first or a second plate.

The clearance or play between a pin and a plate, through which the pin extends, and relative to which the pin is adapted to pivot, can be less than 0.1 mm (especially during pivoting in a radial direction). It is often preferred to select a play which is less than 0.07 mm, especially less than 0.05 mm and most preferably less than 0.03 mm. It is often preferred to design at least one plate and at least one pin in such a way that, while it moves relative to the edge face bounding the window or window section in the plate, the pin closely follows the outline of such edge face. The pin can contact the edge face at least in certain angular positions of such pin relative to the plate. The area of contact between the pin and the plate can include that portion of the edge face in the window or window section of the plate which holds the pin against radial movements. Such area of contact can be nearer to the outer side or to the inner side of the plate. Alternatively, the area of contact can be disposed at the front or rear end of the window or window section (note the arrows 34 in FIG. 3), i.e., not at the outer side or at the inner side of the respective plate.

However, it is equally possible to select the locus of the area of contact between a pin (such as the pin 112 or 114 shown in FIG. 4) in a region other than that indicated by the arrows 38 or 40 or 34 which are shown in FIG. 4. As already mentioned hereinbefore, those surfaces or surface portions of a pin and of a plate which come into or actually are in contact with each other can be rounded and can have different radii of curvature. Reference may be had again to the detailed description of the structure shown in FIG. 4. The presently preferred radii of curvature include 2.5 mm and 4 mm, preferably 3 mm and 3.6 mm, for the rounded surface of a plate, and between 1 mm and 2.5 mm, preferably between −1.5 mm and 1.8 mm, for the pin. A presently preferred spring gradient of the biasing means 230 shown in FIGS. 7 and 8 (or of and equivalent biasing means) can be between 2 N/mm and 50 N/mm, preferably between 10 N/mm and 20 N/mm. The presently preferred play between the plates (212) which the biasing means 230 (or an equivalent thereof) allows is that which corresponds to a movement through 10 mm, preferably 5 mm, most preferably between 0.5 and 2 mm.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making, assembling and utilizing link chains and, therefore, such adaptations should and are intended to be comprehended within the meaning and range of equivalence of the appended claims.

We claim:

1. A link chain, comprising:
    a plurality of pairs of neighboring composite links, the links of each pair being pivotable relative to each other and each link including a stack of plates; and
    a plurality of coupling units, one for each pair of links and each pivotably connecting the respective pair of links, each of said units including at least two adjacent coupling elements and at least some of said plates having windows for the respective coupling elements, at least some of said coupling elements being rockable about axes normal to the respective plates and having rounded external surfaces contacting rounded internal surfaces of the respective plates in said windows thereof, said rounded surfaces having radii of curvature and the ratio of the radii of curvature of said internal surfaces to the radii of curvature of said external surfaces being greater than one, and wherein points of contact between said rounded surfaces of different radii are in low critical stress areas.

2. The link chain of claim 1, wherein said ratio is less than five.

3. The link chain of claim 1, wherein said ratio at least approximates two.

4. A link chain, comprising:
    a plurality of pairs of chain links each including a stack of elongated plates; and
    means for pivotably coupling the links of said pairs to each other, the plates of at least one of said links exhibiting a plurality of first characteristics including first lengths and first pitches $p_1$ and the plates of at least one other link exhibiting a plurality of second characteristics including second lengths and second pitches $p_2$, at least one of said first characteristics being different from at least one of said second characteristics, the chain links of at least one of said pairs being pivotable relative to each other through a first maximum angle $\alpha_{max1}$, the chain links of at least one other of said pairs being pivotable relative to each other through a different second maximum angle $\alpha_{max2}$, and the ratio of said angles and said pitches satisfying the equation $$\alpha_{max2} \geq p_2/p_1 \times \alpha_{max1}.$$

5. A link chain, comprising:
    a plurality of pairs of neighboring composite links, the links of each pair being pivotable relative to each other and each link including a stack of plates; and
    a plurality of coupling units, one for each pair of links and each pivotably connecting the respective pair of links, each of said units including at least two adjacent coupling elements and at least some of said plates having windows for the respective coupling elements, at least some of said coupling elements being rockable about axes normal to the respective plates and having rounded external surfaces contacting rounded internal surfaces of the respective plates in said windows thereof, said rounded surfaces having radii of curvature and the ratio of the radii of curvature of said internal surfaces to the radii of curvature of said external surfaces being greater than one, and wherein points of contact between said rounded surfaces of different radii are in low critical stress areas, and wherein the radii of curvature of one of said internal surfaces and said external surfaces is variable since it gradually changes over the length of the surface.

6. A link chain, comprising:
    a plurality of pairs of neighboring composite links, the links of each pair being pivotable relative to each other and each link including a stack of plates; and
    a plurality of coupling units, one for each pair of links and each pivotably connecting the respective pair of links, each of said units including at least two adjacent coupling elements and at least some of said plates having elongated windows with end sections for the respective coupling elements, with an intermediate section therebetween, wherein the windows are shaped to prevent displacement of the coupling units from the respective end sections into the intermediate section, at least some of said coupling elements being rockable about axes normal to the respective plates and having rounded external surfaces contacting rounded internal surfaces of the respective plates in said windows thereof, said rounded surfaces having radii of curvature and the ratio of the radii of curvature of said internal surfaces to the radii of curvature of said external surfaces being greater than one, and wherein points of contact between said rounded surfaces of different radii are in low critical stress areas.

7. The link chain of claim 6, wherein the plate includes projections that extend into a respective elongate window and define the end sections and in part define the radius of curvature of the rounded internal surface.

* * * * *